May 24, 1938.  H. S. DAVIS  2,118,775
SIGNALING SYSTEM FOR AUTOMOBILES AND OTHER VEHICLES
Filed Oct. 28, 1935  9 Sheets-Sheet 3
Fig. 2.
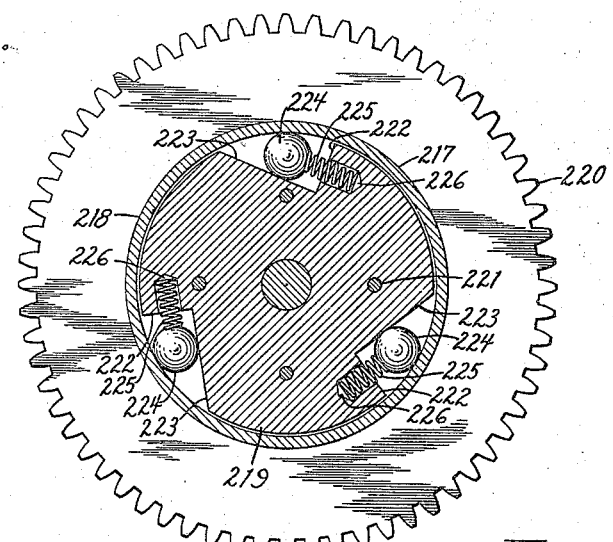
Fig. 3.
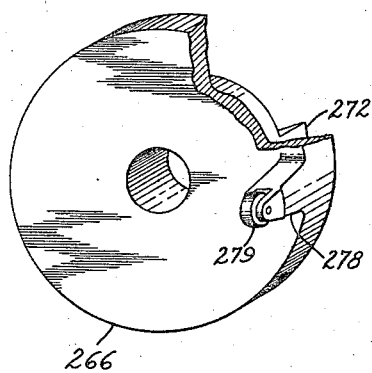
Fig. 4.
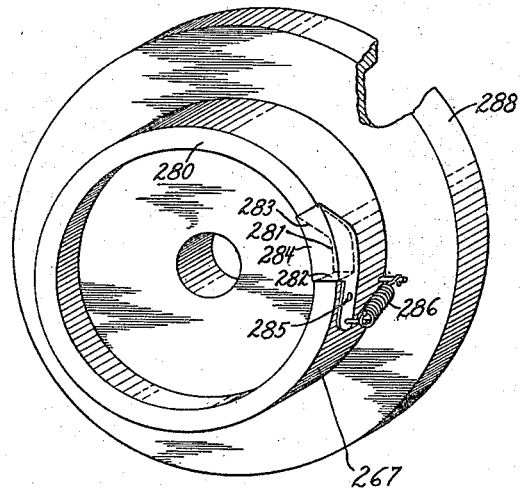
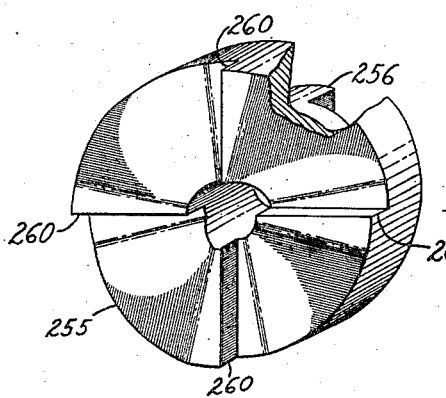
Fig. 5.
Inventor
Henry S. Davis May 24, 1938.  H. S. DAVIS  2,118,775

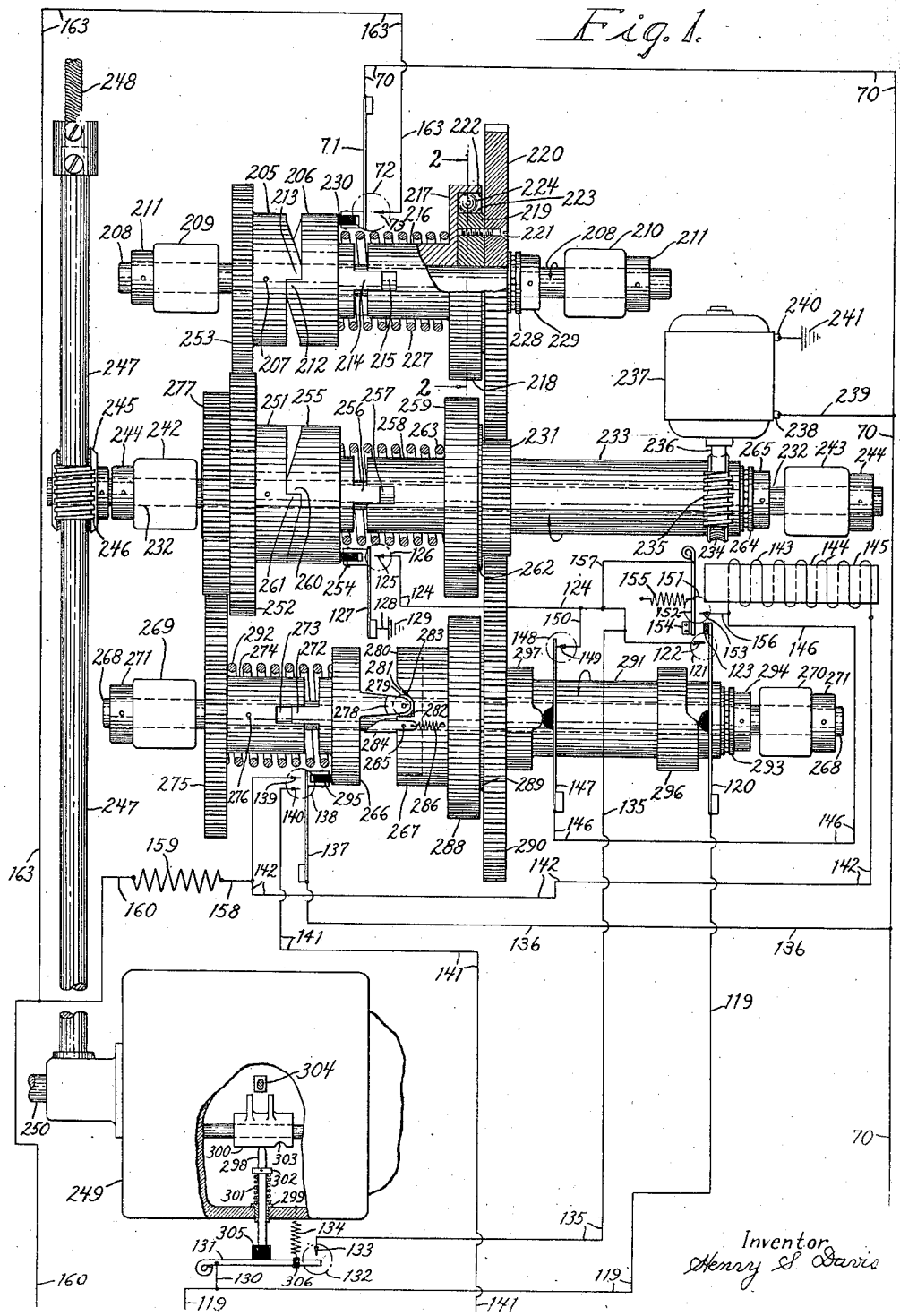

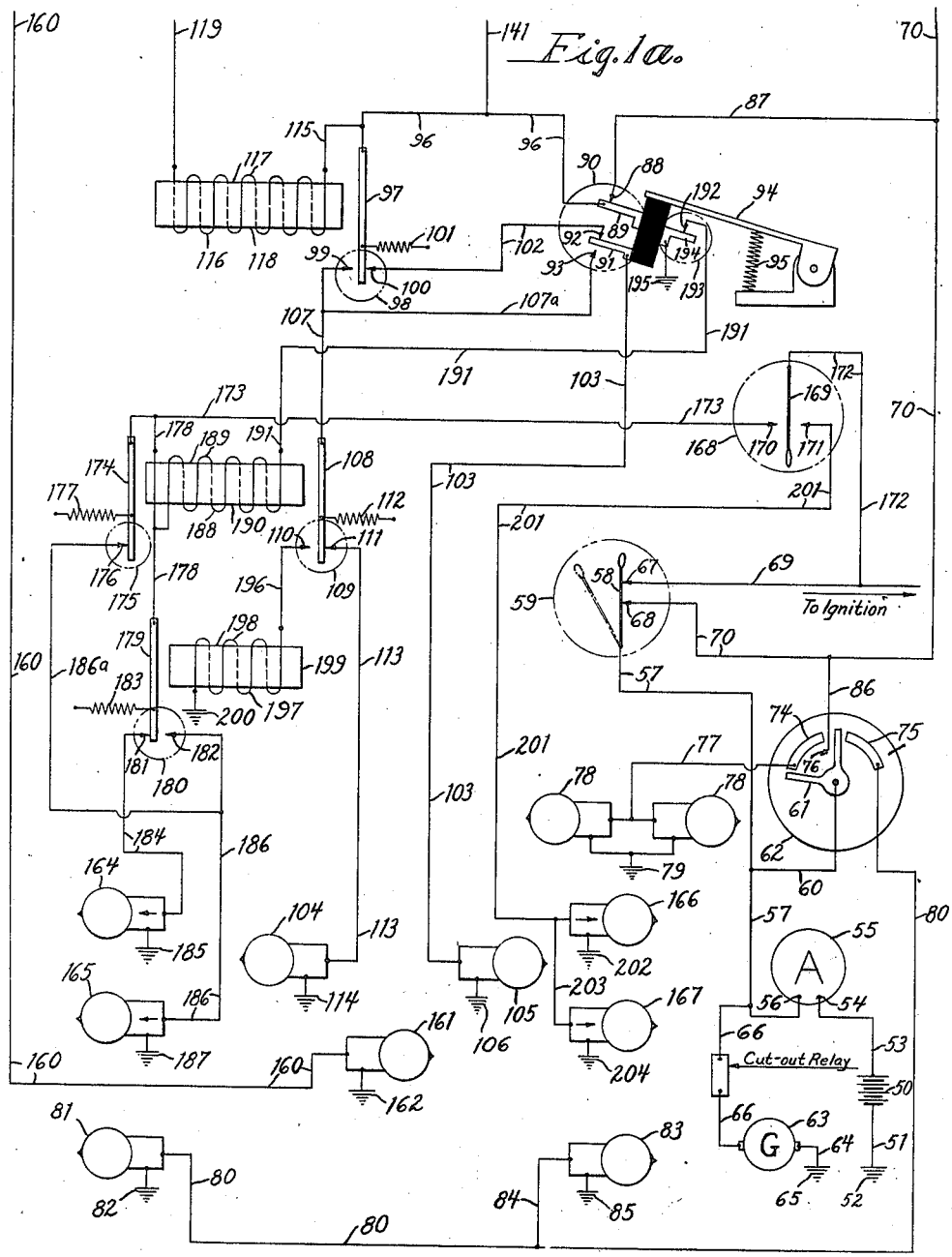

SIGNALING SYSTEM FOR AUTOMOBILES AND OTHER VEHICLES

Filed Oct. 28, 1935   9 Sheets-Sheet 4

SYMBOLS ——— MAXIMUM BRILLIANCY
——— LESS THAN MAX. BRILL.

Fig. 6.

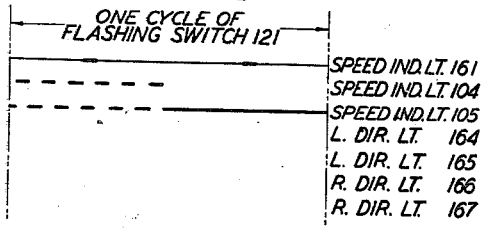

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | {ON / OFF} |
| LIGHTING SWITCH | ON |
| DIRECTION SIGNAL SWITCH | OFF |
| ACCELERATOR | IDLE |
| TRANSMISSION MECHANISM | {NEUTRAL / FORWARD} |

Fig. 7.

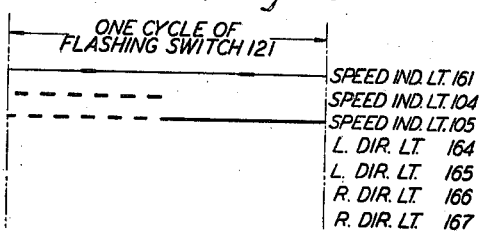

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | ON |
| LIGHTING SWITCH | {ON / OFF} |
| DIRECTION SIGNAL SWITCH | OFF |
| ACCELERATOR | IDLE |
| TRANSMISSION MECHANISM | {NEUTRAL / FORWARD} |

Fig. 8.

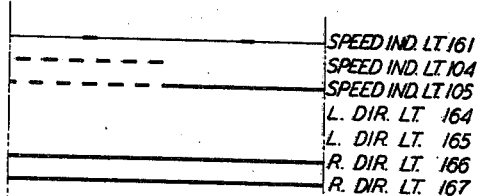

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | ON |
| LIGHTING SWITCH | {ON / OFF} |
| DIRECTION SIGNAL SWITCH | ON RIGHT |
| ACCELERATOR | IDLE |
| TRANSMISSION MECHANISM | {NEUTRAL / FORWARD} |

Fig. 9.

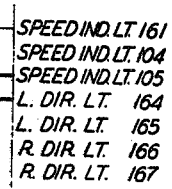

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | ON |
| LIGHTING SWITCH | {ON / OFF} |
| DIRECTION SIGNAL SWITCH | ON LEFT |
| ACCELERATOR | IDLE |
| TRANSMISSION MECHANISM | {NEUTRAL / FORWARD} |

Inventor
Henry S. Davis

May 24, 1938.    H. S. DAVIS    2,118,775
SIGNALING SYSTEM FOR AUTOMOBILES AND OTHER VEHICLES
Filed Oct. 28, 1935    9 Sheets—Sheet 5

Fig. 10.

| | |
|---|---|
| ——————— | SPEED IND. LT. 161 |
| — — — — — | SPEED IND. LT. 104 |
| — — — — — | SPEED IND. LT. 105 |
| | L. DIR. LT. 164 |
| | L. DIR. LT. 165 |
| | R. DIR. LT. 166 |
| | R. DIR. LT. 167 |

| | |
|---|---|
| VEHICLE | STANDSTILL |
| IGNITION SWITCH | ON |
| LIGHTING SWITCH | {ON / OFF} |
| DIRECTION SIGNAL SWITCH | OFF |
| ACCELERATOR | OPERATED |
| TRANSMISSION MECHANISM | {NEUTRAL / FORWARD} |

Fig. 11.

| | |
|---|---|
| ——— | SPEED IND. LT. 161 |
| — — — | SPEED IND. LT. 104 |
| — — — | SPEED IND. LT. 105 |
| | L. DIR. LT. 164 |
| | L. DIR. LT. 165 |
| | R. DIR. LT. 166 |
| | R. DIR. LT. 167 |

| | |
|---|---|
| VEHICLE SPEED | 21 M.P.H. |
| IGNITION SWITCH | ON |
| LIGHTING SWITCH | {ON / OFF} |
| DIRECTION SIGNAL SWITCH | OFF |
| ACCELERATOR | OPERATED |
| TRANSMISSION MECHANISM | {NEUTRAL / FORWARD} |

Fig. 12.

| | |
|---|---|
| — — — | SPEED IND. LT. 161 |
| — — — | SPEED IND. LT. 104 |
| — — — | SPEED IND. LT. 105 |
| | L. DIR. LT. 164 |
| | L. DIR. LT. 165 |
| ——————— | R. DIR. LT. 166 |
| ——————— | R. DIR. LT. 167 |

| | |
|---|---|
| VEHICLE SPEED | 21 M.P.H. |
| IGNITION SWITCH | ON |
| LIGHTING SWITCH | {ON / OFF} |
| DIRECTION SIGNAL SWITCH | ON RIGHT |
| ACCELERATOR | OPERATED |
| TRANSMISSION MECHANISM | {NEUTRAL / FORWARD} |

Fig. 13.

| | |
|---|---|
| — — — | SPEED IND. LT. 161 |
| — — — | SPEED IND. LT. 104 |
| — — — | SPEED IND. LT. 105 |
| ——————— | L. DIR. LT. 164 |
| ——————— | L. DIR. LT. 165 |
| | R. DIR. LT. 166 |
| | R. DIR. LT. 167 |

| | |
|---|---|
| VEHICLE SPEED | 21 M.P.H. |
| IGNITION SWITCH | ON |
| LIGHTING SWITCH | {ON / OFF} |
| DIRECTION SIGNAL SWITCH | ON LEFT |
| ACCELERATOR | OPERATED |
| TRANSMISSION MECHANISM | {NEUTRAL / FORWARD} |

Inventor
Henry S. Davis

Fig. 14.

|  | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| ═══════ | R. DIR. LT. 166 |
| | R. DIR. LT. 167 |
| VEHICLE SPEED | 25 TO MAX. M.P.H. |
| IGNITION SWITCH | ON |
| LIGHTING SWITCH | { ON / OFF } |
| DIRECTION SIGNAL SWITCH | ON RIGHT |
| ACCELERATOR | OPERATED |
| TRANSMISSION MECHANISM | { NEUTRAL / FORWARD } |

Fig. 15.

|  | |
|---|---|
| | SPEED IND. LT. 161 |
| | SPEED IND. LT. 104 |
| | SPEED IND. LT. 105 |
| ═══════ | L. DIR. LT. 164 |
| | L. DIR. LT. 165 |
| | R. DIR. LT. 166 |
| | R. DIR. LT. 167 |
| VEHICLE SPEED | 25 TO MAX. M.P.H. |
| IGNITION SWITCH | ON |
| LIGHTING SWITCH | { ON / OFF } |
| DIRECTION SIGNAL SWITCH | ON LEFT |
| ACCELERATOR | OPERATED |
| TRANSMISSION MECHANISM | { NEUTRAL / FORWARD } |

Fig. 16.

|  | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 25 TO MAX. M.P.H. |
| IGNITION SWITCH | ON |
| LIGHTING SWITCH | { ON / OFF } |
| DIRECTION SIGNAL SWITCH | OFF |
| ACCELERATOR | OPERATED |
| TRANSMISSION MECHANISM | { NEUTRAL / FORWARD } |

Fig. 17.

|  | |
|---|---|
| | SPEED IND. LT. 161 |
| | SPEED IND. LT. 104 |
| ═══════ | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 40 TO MAX. M.P.H. |
| IGNITION SWITCH | ON |
| LIGHTING SWITCH | { ON / OFF } |
| DIRECTION SIGNAL SWITCH | OFF |
| ACCELERATOR | IDLE |
| TRANSMISSION MECHANISM | { NEUTRAL / FORWARD } |

Inventor
Henry S. Davis

May 24, 1938. H. S. DAVIS 2,118,775
SIGNALING SYSTEM FOR AUTOMOBILES AND OTHER VEHICLES
Filed Oct. 28, 1935    9 Sheets-Sheet 7

Fig. 18.

| | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 40 TO MAX. M.P.H. |
| IGNITION SWITCH | ON |
| LIGHTING SWITCH | {ON/OFF} |
| DIRECTION SIGNAL SWITCH | ON RIGHT |
| ACCELERATOR | IDLE |
| TRANSMISSION MECHANISM | {NEUTRAL/FORWARD} |

Fig. 19.

| | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 40 TO MAX. M.P.H. |
| IGNITION SWITCH | ON |
| LIGHTING SWITCH | {ON/OFF} |
| DIRECTION SIGNAL SWITCH | ON LEFT |
| ACCELERATOR | IDLE |
| TRANSMISSION MECHANISM | {NEUTRAL/FORWARD} |

Fig. 20.

| | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 35 M.P.H. |
| IGNITION SWITCH | ON |
| LIGHTING SWITCH | {ON/OFF} |
| DIRECTION SIGNAL SWITCH | OFF |
| ACCELERATOR | IDLE |
| TRANSMISSION MECHANISM | {NEUTRAL/FORWARD} |

Fig. 21.

| | |
|---|---|
| | SPEED IND. LT. 161 |
| | SPEED IND. LT. 104 |
| | SPEED IND. LT. 105 |
| | L. DIR. LT. 164 |
| | L. DIR. LT. 165 |
| | R. DIR. LT. 166 |
| | R. DIR. LT. 167 |
| VEHICLE SPEED | 35 M.P.H. |
| IGNITION SWITCH | ON |
| LIGHTING SWITCH | {ON/OFF} |
| DIRECTION SIGNAL SWITCH | ON LEFT |
| ACCELERATOR | IDLE |
| TRANSMISSION MECHANISM | {NEUTRAL/FORWARD} |

Inventor
Henry S. Davis

May 24, 1938.  H. S. DAVIS  2,118,775
SIGNALING SYSTEM FOR AUTOMOBILES AND OTHER VEHICLES
Filed Oct. 28, 1935  9 Sheets-Sheet 8

Fig. 22.

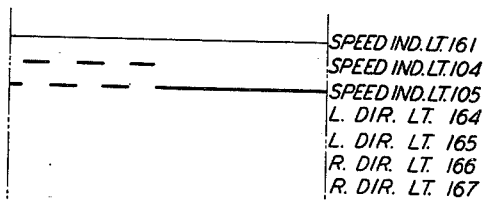

| VEHICLE SPEED | 21 M.P.H. |
| --- | --- |
| IGNITION SWITCH | ON |
| LIGHTING SWITCH | {ON/OFF} |
| DIRECTION SIGNAL SWITCH | OFF |
| ACCELERATOR | IDLE |
| TRANSMISSION MECHANISM | {NEUTRAL/FORWARD} |

Fig. 23.

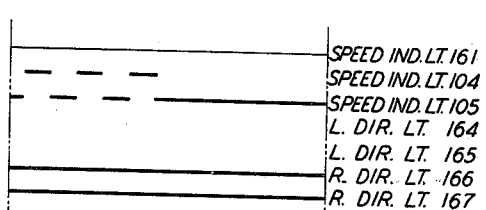

| VEHICLE SPEED | 21 M.P.H. |
| --- | --- |
| IGNITION SWITCH | ON |
| LIGHTING SWITCH | {ON/OFF} |
| DIRECTION SIGNAL SWITCH | ON RIGHT |
| ACCELERATOR | IDLE |
| TRANSMISSION MECHANISM | {NEUTRAL/FORWARD} |

Fig. 24.

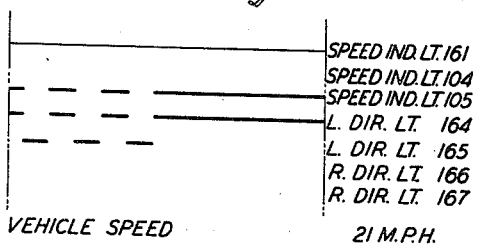

| VEHICLE SPEED | 21 M.P.H. |
| --- | --- |
| IGNITION SWITCH | ON |
| LIGHTING SWITCH | {ON/OFF} |
| DIRECTION SIGNAL SWITCH | ON LEFT |
| ACCELERATOR | IDLE |
| TRANSMISSION MECHANISM | {NEUTRAL/FORWARD} |

Fig. 25.

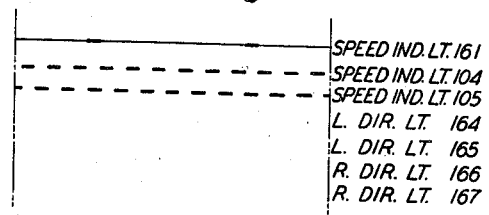

| VEHICLE | STANDSTILL |
| --- | --- |
| IGNITION SWITCH | ON |
| LIGHTING SWITCH | {ON/OFF} |
| DIRECTION SIGNAL SWITCH | OFF |
| ACCELERATOR | IDLE |
| TRANSMISSION MECHANISM | REVERSE |

Inventor
Henry S. Davis

May 24, 1938.   H. S. DAVIS   2,118,775
SIGNALING SYSTEM FOR AUTOMOBILES AND OTHER VEHICLES
Filed Oct. 28, 1935     9 Sheets-Sheet 9

Fig. 26.

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | ON |
| LIGHTING SWITCH | {ON/OFF} |
| DIRECTION SIGNAL SWITCH | ON RIGHT |
| ACCELERATOR | IDLE |
| TRANSMISSION MECHANISM | REVERSE |

Fig. 27.

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE | STANDSTILL |
| IGNITION SWITCH | ON |
| LIGHTING SWITCH | {ON/OFF} |
| DIRECTION SIGNAL SWITCH | ON LEFT |
| ACCELERATOR | IDLE |
| TRANSMISSION MECHANISM | REVERSE |

Fig. 28.

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE SPEED | REV. 7 M.P.H. |
| IGNITION SWITCH | ON |
| LIGHTING SWITCH | {ON/OFF} |
| DIRECTION SIGNAL SWITCH | OFF |
| ACCELERATOR | OPERATED |
| TRANSMISSION MECHANISM | REVERSE |

Fig. 29.

|  |  |
|---|---|
|  | SPEED IND. LT. 161 |
|  | SPEED IND. LT. 104 |
|  | SPEED IND. LT. 105 |
|  | L. DIR. LT. 164 |
|  | L. DIR. LT. 165 |
|  | R. DIR. LT. 166 |
|  | R. DIR. LT. 167 |
| VEHICLE SPEED | REV. 7 M.P.H. |
| IGNITION SWITCH | ON |
| LIGHTING SWITCH | {ON/OFF} |
| DIRECTION SIGNAL SWITCH | ON LEFT |
| ACCELERATOR | OPERATED |
| TRANSMISSION MECHANISM | REVERSE |

Inventor
Henry S. Davis

Patented May 24, 1938

2,118,775

UNITED STATES PATENT OFFICE 2,118,775

SIGNALING SYSTEM FOR AUTOMOBILES AND OTHER VEHICLES

Henry S. Davis, West Haven, Conn.

Application October 28, 1935, Serial No. 47,007

26 Claims. (Cl. 177—311)

This invention relates to improvement in signaling systems and particularly to signaling systems for automobiles and other vehicles.

The present case is a continuation-in-part of my copending applications, Serial No. 701,280, filed December 7, 1933, for Signaling systems for automobiles and other vehicles, patented February 11, 1936, No. 2,030,246, and Serial No. 39,118, filed September 4, 1935, for Speed-responsive control-mechanism, patented March 2, 1937, No. 2,072,246.

One of the objects of the present invention is to provide reliable and effective automatic means, whereby the conditions under which a vehicle is being operated will be indicated to extraneous observers, that is to say, observers outside of the vehicle such, for instance, as drivers of other automobiles, pedestrians, etc., etc.

Another object is to provide superior and effective signaling means, whereby the approximate speed of the vehicle will be indicated to an observer outside of the vehicle.

It is particularly desirable in connection with automatic speed-responsive switch means as used on automobiles that reliable and effective means be provided for actuating the same. Speed-responsive switches have been principally of the centrifugal governor actuated type with the result that great difficulty has been experienced as a governor which is designed with sufficient power to operate any mechanism at relatively slow rates of speed develops weight, momentum, space and vibration disadvantages at higher rates of speed. Such a governor has a tendency to cause the switch means to chatter or vibrate when the vehicle speed varies slightly with respect to the speed at which the said governor is designed to operate the switch means. Also, the governor is influenced to a certain degree by the travel of the vehicle on a rough surface. It is, therefore, another object of the present invention to include in a superior and effective vehicle signaling system, automatic means designed to overcome the above stated disadvantages and operating in an improved manner to effect signal indications and change the character thereof.

Another object is to provide superior automatic means whereby an observer extraneous to the vehicle is informed of the intent of the driver of the vehicle before the vehicle is set in motion.

A further object is to provide superior and effective means which will automatically indicate to those outside the vehicle, changes in the condition of the operating members of the vehicle, as such changes may take place.

A still further object is to provide superior automatic means whereby conditions of acceleration or retardation, or both, of the vehicle will be indicated to extraneous observers.

Still another object is to provide superior automatic signaling means for indicating the direction of travel of the vehicle.

A further object is to provide improved signaling means combining certain of the features above referred to.

With the above and other objects in view, as will appear to those skilled in the art from the following, considered in conjunction with the accompanying drawings and appended claims, the present invention includes all features disclosed therein which are novel over the prior art.

In the accompanying drawings:

Figs. 1 and 1ª together constitute a schematic and diagrammatic illustration of one form which a signaling system may assume in accordance with the present invention;

Fig. 2 is a transverse sectional view taken on the line 2—2 of Fig. 1;

Fig. 3 is a perspective view of one of the control-units which is broken away to show the coupling-tongue thereof;

Fig. 4 is a perspective view of the complementary control-unit and associated outer clutch-member;

Fig. 5 is a perspective view of one of the cam-heads which is broken away to show the coupling-tongue thereof.

Figs. 6 to 29 inclusive are diagrammatic views respectively representing the energization of the various signal lights in response to various combinations of settings of the operating features of an automobile.

The particular signaling system herein chosen for the illustration of the present invention includes the usual storage battery 50 having one of its terminals connected in the conventional manner to a conductor 51 which latter is grounded as indicated at 52. The opposite terminal of the storage battery 50 is connected by means of a wire 53 to a terminal 54 of an ammeter 55, which latter includes the usual second terminal 56. The terminal 56 of the ammeter 55 is connected by means of a wire 57 to a blade 58 of an ignition switch generally designated by the numeral 59.

Connected into the wire 57 is a wire 60 leading to a V-shaped rotary blade 61 forming a feature of a lighting switch generally designated by the numeral 62.

In conjunction with the storage battery 50, a generator 63 is employed, one terminal of which is connected by a conductor 64 to ground as indicated at 65. The terminal of opposite polarity of the generator 63 is connected by a wire 66 to the wire 57 which interconnects the terminal 56 of the ammeter 55 and the blade 58 of the ignition switch 59.

The blade 58 of the ignition switch 59 is adapted when in its closed-circuit position to engage contacts 67 and 68, the contact 67 being connected by means of a wire 69 to a unit of the ignition system (not shown) of an automobile. The contact 68 of the said ignition switch 59 constitutes an "extra contact", so to speak, inasmuch as it does not form a feature of an ordinary ignition switch, and is connected to what, for convenience of description, may be termed a main wire 70 leading eventually to the flexible blade 71 of an auxiliary flashing-switch generally designated by the numeral 72, and including also a contact 73.

The lighting switch 62 includes in addition to the V-shaped rotary blade 61, before referred to, stationary segments 74 and 75, and a stationary contact 76. The blade 61, when in one of its two circuit-closing positions, is adapted to engage the segments 74 and 75. The said blade 61, when in the other of its circuit-closing positions, is adapted to engage the segments 74 and 75 and also the contact 76 to affect circuits as will be hereinafter described.

The segment 74 of the lighting switch 62 is connected by means of a wire 77 to two lights 78—78 intended to be located at the front of the vehicle for illumination purposes. To complete the circuits through the lights 78—78, one terminal of each is connected to ground as indicated at 79.

The segment 75 of the said lighting switch 62 is connected by means of a wire 80 to one terminal of a conventional tail-light 81, the other terminal of which is connected directly to ground as indicated at 82. A second tail-light 83 is shown as being provided and has one of its terminals connected to a wire 84 while its other terminal is connected directly to ground as indicated at 85. The wire 84 interconnects the wire 80 with the tail-light 83.

The stationary contact 76 of the lighting switch 62 is connected by means of a wire 86 to the main wire 70 before referred to.

Connected into the main wire 70 is a wire 87 leading to a stationary contact 88 which co-acts with a movable arm or blade 89, both of which form features of a switch generally designated by the numeral 90 and which, for convenience of description, may be described as an "accelerator-operated control" switch, for the reason that it is automatically operated as an incident of the operation of the vehicle accelerator and participates in controlling the illumination of various signal lights, hereinafter to be described in detail.

The accelerator-operated control switch 90 also includes a second blade 91 and co-acting contacts 92 and 93. The said blades 89 and 91 are movable with but insulated from an accelerator-pedal 94, which latter is urged upwardly by a spring 95. The said blades 89 and 91, in addition to being insulated from the said accelerator-pedal 94, are insulated from each other as shown in Fig. 1.

The blade 89 of the switch 90 is connected by means of a wire 96 to a pivotal blade 97 of magnetic material of an electromagnetically-operated selecting-switch, generally designated by the numeral 98, and including in addition to the said blade 97, contacts 99 and 100, and a spring 101, which latter exerts a constant effort to engage the said blade 97 with the said contact 100. A wire 102 connects the contact 92 of the switch 90 to the contact 100 of the electromagnetically-operated selecting-switch 98, while the blade 91 of the switch 90 is connected by means of a wire 103 to one terminal of a signal-light designated by the numeral 105 which with a complementary signal-light designated by the numeral 104 may properly be termed "speed-indicating lights". The other terminal of the speed-indicating light 105 is connected directly to ground as indicated at 106.

The light rays effected by the said speed-indicating lights 104 and 105 are preferably differentially colored by any appropriate means known in the art. It is intended that the energization of the said light 104 will effect red rays, and the energization of the said light 105 will effect yellow rays.

The contact 99 of the electromagnetically-operated selecting-switch 98 is connected by means of a wire 107 to a pivotal blade 108 of magnetic material of an electromagnetically-operated speed-indicating-direction-signal selecting-switch, generally designated by the numeral 109, and including in addition to the said blade 108, contacts 110 and 111, and a spring 112, which latter exerts a constant effort to engage the blade 108 with the said contact 111. A wire 113 connects the contact 111 to one terminal of the speed-indicating light 104, before referred to. The other terminal of the said light 104 is connected directly to ground as indicated at 114.

A wire 107ᵃ interconnects the wire 107 and the contact 93 of the accelerator-operated control switch 90, previously referred to.

Connected into the wire 96 is a wire 115 leading to one terminal of a coil 116 forming a feature of an electromagnet, generally designated by the numeral 117, and encircling a core 118 formed of magnetic material, one end of which is located adjacent the pivotal blade 97 of the switch 98 so as to move the said blade 97 out of engagement with the contact 100 and into engagement with the contact 99 when various control means, to be described, participate in effecting the energization of the said electromagnet 117. The opposite terminal of the coil 116 is connected by means of a wire 119 to the base of a flexible blade 120 of an automatic constant-speed flashing-switch generally designated by the numeral 121 and including, in addition to the said blade 120, a contact 122 and an insulating member 123.

The contact 122 of the automatic constant-speed flashing-switch 121, just referred to, is connected by means of a wire 124 to a contact 125 forming a feature of an automatic main flashing-switch generally designated by the numeral 126 and including in addition to the said contact 125, a flexible blade 127. The base of the said blade 127 is connected by means of a wire 128 to ground as indicated at 129.

Connected into the wire 119 is a wire 130 leading to a pivotal blade 131 forming a feature of a transmission-operated flash-frequency-selector switch, generally designated by the numeral 132 and including also a stationary contact 133 and a spring 134, which latter exerts a constant effort to engage the blade 131 with the said contact 133. A wire 135 interconnects the said contact 133 with the wire 124, before referred to.

Included among the various wires connected into the main wire 70 is a wire 136 leading to a flexible blade 137 forming a feature of a switch, generally designated by the numeral 138 and which, for convenience of description, may be described as a "speed-operated control switch" for the reason that it is automatically operated when the speed of the vehicle changes with respect to a predetermined speed. The said speed-operated control switch 138 also includes stationary contacts 139 and 140 which latter is connected by means of a wire 141 to the wire 96, previously referred to.

The contact 139 of the said switch 138 is connected by means of a wire 142 to one terminal of a coil 143 forming a feature of an electromagnet, generally designated by the numeral 144, and encircling a core 145 formed of magnetic material. The opposite terminal of the coil 143 is connected by means of a wire 146 to the base of a flexible blade 147 of an automatic constant-speed locking-circuit control switch generally designated by the numeral 148 and including in addition to the said blade 147, a contact 149, which latter is connected by means of a wire 150 to the wire 124, before referred to.

Co-acting with the said automatic constant-speed locking-circuit control switch 148 as a unit of the locking circuit is an electromagnetically-operated switch generally designated by the numeral 151 and including a movable arm or blade 152, a stationary contact 153, a stop lug 154, and a spring 155, which latter exerts a constant effort to engage the blade 152 with the stop lug 154 and out of engagement with the contact 153. The said blade 152 of the switch 151 is located adjacent one end of the core 145 of the electromagnet 144, and also adjacent the upper end of the flexible blade 120 of the automatic constant-speed flashing-switch 121, as shown in Fig. 1 of the drawings. The said blade 152 is thus under the control of the said electromagnet 144 and serves the dual purposes of co-acting with the contact 153 and of providing an actuating and holding means for the flexible blade 120 of the said switch 121.

Connected into the wire 146 is a wire 156 leading to the contact 153 of the switch 151, just described. A wire 157 connects the blade 152 of the said switch 151 to the wire 124.

Connected into the wire 142, before referred to, is a wire 158 leading to a terminal of a resistance unit 159, a complementary terminal of which is connected by means of a wire 160 to one terminal of a signal-light designated by the numeral 161 and which may properly be termed an "auxiliary speed-indicating light" for the reason that its function is supplementary to that of the speed-indicating lights 104 and 105, previously described. The other terminal of the said auxiliary speed-indicating light 161 is connected directly to ground as indicated at 162.

Returning now to the auxiliary flashing-switch 72, the contact 73 thereof is connected by means of a wire 163 to the wire 160 to provide a circuit including the said switch 72 to the auxiliary speed-indicating light 161, just referred to, to on occasion cause the flashing thereof as will be hereinafter described in detail.

For the purpose of selectively energizing two complementary left-direction lights 164 and 165 and two complementary right-direction lights 166 and 167, a direction-signal switch is provided which is generally designated by the numeral 168 and includes a blade 169 adapted to alternately engage a left contact 170 and a right contact 171. The said blade 169 may be manually operated directly for energizing the respective left-direction lights 164 and 165, or right-direction lights 166 and 167, or the same may be automatically operated, such for instance as by connecting the same to a portion of the steering apparatus of the automobile.

The blade 169 of the direction-signal switch 168 is connected by means of a wire 172 to the wire 69 which leads from the ignition switch 59 to the ignition system (not shown) as before described. The left contact 170 of the said switch 168 is connected by means of a wire 173 to a pivotal blade 174 formed of magnetic material and constituting a feature of an automatic switch generally designated by the numeral 175. The said automatic switch 175 may, for convenience of description, be termed a constant-brilliancy cutout-switch and also includes a contact 176 and a spring 177, which latter exerts a constant effort to engage the blade 174 with the said contact 176.

Connected into the wire 173 is a wire 178 leading to a pivotal blade 179 of magnetic material of an electromagnetically-operated direction-signal selecting-switch, generally designated by the numeral 180, and including in addition to the said blade 179, contacts 181 and 182, and a spring 183, which latter exerts a constant effort to engage the blade 179 with the said contact 181. A wire 184 connects the contact 181 of the said switch 180 to one terminal of the left-direction light 164, previously referred to. The other terminal of the left-direction light 164 is connected directly to ground as indicated at 185.

The contact 182 of the electromagnetically-operated direction-signal selecting-switch 180 is connected by means of a wire 186 to one terminal of the complementary left-direction light 165, the other terminal of which is connected directly to ground as indicated at 187. A wire 186ª interconnects the said wire 186 and the contact 176 of the constant-brilliancy cutout-switch 175.

Connected into the wire 178, before referred to, is one terminal of a coil 188 forming a feature of an electromagnet, generally designated by the numeral 189, and encircling a core 190 formed of magnetic material, one end of which is located adjacent the pivotal blade 108 of the speed-indicating-direction-signal selecting-switch 109 so as to, upon occasion, move the said blade 108 out of engagement with the contact 111 and into engagement with the contact 110. The opposite end of the said core 190 is located adjacent the pivotal blade 174 of the constant-brilliancy cutout-switch 175 so as to move the said blade 174 out of engagement with the contact 176 simultaneously with the movement of the blade 108 of the switch 109 as just described.

The opposite terminal of the coil 188 of the electromagnet 189 is connected by means of a wire 191 to a contact 192 forming a feature of a direction-light periodicity-control switch, generally designated by the numeral 193. The said switch 193 also includes a blade 194 which is connected directly to ground as indicated at 195, and is automatically operated as an incident of the movement of the accelerator-pedal 94, previously referred to.

With reference to the electromagnetically-operated speed-indicating-direction-signal selecting-switch 109, the contact 110 thereof is connected by means of a wire 196 to one terminal of a coil 197 forming a feature of an electromagnet, generally designated by the numeral 198, and encircling a core 199 formed of magnetic material, one end of which is located adjacent the pivotal blade 179 of the direction-signal selecting-switch 180 so as to, on occasion, move the said blade 179 out of engagement with the contact 181 and into engagement with the contact 182 for the purpose of selectively energizing the complementary left-direction lights 164 and 165 as will be hereinafter described. The opposite terminal of the said coil 197 is connected directly to ground as indicated at 200.

The contact 171 of the direction-signal switch 168 is connected directly by means of a wire 201 to one terminal of the right-direction light 166, the other terminal of which is connected to ground as indicated at 202. A wire 203 is connected into the said wire 201 and leads to one terminal of the complementary right-direction light 167, the other terminal of which is connected to ground as indicated at 204.

The mechanism which controls the operation of the auxiliary flashing-switch 72, previously described, includes two complementary cooperating rotary cam-heads 205 and 206 which are adapted for concurrent and relative rotation, and one at least of which is adapted for axial movement with respect to its complementary cam-head.

The rotary cam-head 205 is rigidly secured by a pin 207 to a shaft 208 journaled adjacent its respective opposite ends in bearings 209 and 210 and held against axial displacement by means of suitable collars 211—211.

The forward face of the rotary cam-head 206 is provided with two (more or less) diametrically-opposite wedge-shaped cam-lugs 212—212 adapted on occasion to alternately engage a similarly-shaped cam-lug 213 provided on the adjacent face of the rotary cam-head 205.

The rotary cam-head 206 is mounted upon the shaft 208 with freedom for both rotary movement and axial movement with respect thereto and is, on occasion, driven independently of the said shaft 208 by being provided with a coupling-tongue 214 fitting within a coupling-notch 215 formed in the hub 216 of an outer clutch-member 217, forming a part of a one-way clutch.

The outer clutch-member 217 is of cup-shaped form and includes an annular flange 218 receiving a complementary inner clutch-member 219 rigidly secured to a gear-wheel 220 in any suitable manner such, for instance, as by screws 221. The inner clutch-member 219 is provided with a plurality of notches 222, each of which provides an outwardly-facing tangential surface 223. Intermediate the inner surface of the flange 218 of the outer clutch-member 217 and the tangential surface 223 of each of the notches 222 is interposed a ball-like coupling-member 224, pressed into engagement with the said surfaces by a helical spring 225 seated in a pocket 226 in the said inner clutch-member 219. Both of the clutch-members 217 and 219, as well as the gear-wheel 220, are mounted upon the shaft 208 with freedom for relative rotary movement with respect thereto.

Encircling the hub 216 of the outer clutch-member 217 is a helical spring 227 bearing at one end against the adjacent face of the enlarged portion of the said outer clutch-member and bearing at its opposite end against the opposing face of the rotary cam-head 206. To prevent the spring 227 from axially displacing the clutch-members 217 and 219 and the gear-wheel 220, an antifriction thrust-bearing 228 is mounted upon the shaft 208 against the face of the gear-wheel 220 opposite the said clutch-members 217 and 219. The said antifriction thrust-bearing in turn rests against a collar 229 rigidly secured in any suitable manner to the shaft 208.

Bearing against the face of the rotary cam-head 206 opposite the cam-lugs 212—212 thereof is a roller 230 mounted on the outer end of the flexible blade 71 of the auxiliary flashing-switch 72, previously described.

The gear-wheel 220, and hence the rotary cam-head 206 which is connected thereto by the one-way clutch, which latter includes in the main the parts 217, 219 and 224, is driven in the direction indicated by the arrows in Fig. 1 by a gear-wheel 231 mounted with freedom for relative rotation upon a shaft 232 and meshing into the said gear-wheel 220. The hub 233 of the gear-wheel 231 has rigidly secured thereto a worm-wheel 234 meshed into and driven by a worm 235 rigidly mounted upon the shaft 236 of an electric motor 237. The electric motor 237 has one of its terminals 238 connected by means of a wire 239 to the main wire 70, and has its complementary terminal 240 connected to ground as indicated at 241. The said electric motor 237, which is preferably of a constant-speed type, acts when energized to drive the gear-wheel 231 at a rate of speed corresponding to the speed at which the shaft 232 would be driven by the movement of the vehicle, in the manner as will be hereinafter described, when the same is travelling forwardly at a rate of forty miles per hour, or any other predetermined speed.

The shaft 232 is mounted for turning movement near its respective opposite ends in suitable bearings 242 and 243, and is prevented from undue axial movement by means of collars 244—244 engaging the said bearings. Adjacent the bearing 242, the shaft 232 has rigidly secured to it a worm-wheel 245 which latter is meshed into and driven by a worm 246 mounted upon a shaft 247 for rotation therewith. The said shaft 247 extends at a right angle to the axes of the shafts 208 and 232, before referred to. The shaft 247 may be driven in any approved manner from a running member of the automobile, but as shown in Fig. 1, the said shaft 247 extends into a transmission-housing 249 and is connected in the conventional manner (not shown) to the drive-shaft 250 of the automobile.

A speedometer shaft 248 is connected to the shaft 247 at the end opposite the transmission-housing 249 for the purpose of operating a conventional speedometer (not shown).

Rigidly secured by means of a pin to the shaft 232, adjacent the bearing 242, is a rotary cam-head 251 corresponding to the rotary cam-head 205, before referred to, and having secured thereto a gear-wheel 252 which meshes into and drives a gear-wheel 253 rigidly attached to the rotary cam-head 205, and hence rigidly attached to the shaft 208.

The gear-wheel 220 is driven by the gear-wheel 231, and hence by the electric motor 237, as previously described, at a rate of speed one-third the speed at which the gear-wheel 231 rotates. The ratio of the gear-wheels 252 and 253, just referred to, determines the vehicle speed at which the speed of the shaft 208 corresponds to the speed of the said gear-wheel 220 and, in the present embodiment of the invention, the above stated condition exists when the vehicle speed is forwardly at the rate of ten miles per hour.

Returning now to the automatic main flashing-switch 126, the outer end of the flexible blade 127 thereof is provided with a roller 254 bearing against the rear face of a rotary cam-head 255 mounted upon the shaft 232 with freedom for relative rotary movement and axial movement with respect thereto and is, on occasion, rotated independently of the said shaft 232 by being provided with a coupling-tongue 256 slidable longitudinally in a coupling-notch 257 formed in the hub 258 of an outer clutch-member 259.

The forward face of the rotary cam-head 255 is provided with four (more or less) diametrically equally-spaced wedge-shaped cam-lugs 260—260 adapted on occasion to be consecutively engaged by a similar-shaped cam-lug 261 provided on the adjacent face of the rotary cam-head 251, before referred to.

The outer clutch-member 259, just referred to, corresponds to the clutch-member 217, and like the same cooperates with an inner clutch-member 262 rigidly secured to the gear-wheel 231, before referred to. Encircling the hub 258 of the outer clutch-member 259 is a helical spring 263 bearing at one end against the adjacent face of the enlarged portion of the outer clutch-member 259 and at its opposite end bearing against the rear face of the rotary cam-head 255, before referred to, and exerting a constant effort to urge the said cam-head 255 axially toward the complementary rotary cam-head 251.

The spring 263, just referred to, tends to slide the gear-wheel 231 and its hub 233 along the shaft 232 toward the bearing 243, and the movement referred to is guarded against by an antifriction thrust-bearing 264 which is in turn held in place by a collar 265 rigidly secured to the shaft 232.

From the foregoing, it will be seen that both of the shafts 208 and 232 are concurrently rotated from the shaft 247 and hence both of the rotary cam-heads 205 and 251 are similarly driven, though at different rates of speed and in opposite directions. It will also be apparent that the electric motor 237 when energized will, on occasion, effect the concurrent rotation of both of the rotary cam-heads 206 and 255 which respectively complement and cooperate with the cam-heads 205 and 251, just referred to.

The mechanism which controls the operation of the speed-operated control switch 138, previously described, includes two complementary cooperating control-units 266 and 267 which are adapted for concurrent and relative rotation, and one at least of which is adapted for axial movement with respect to its complementary control-unit.

The control-units 266 and 267 are mounted upon a shaft 268 journaled adjacent its respective opposite ends in bearings 269 and 270 and is held against axial displacement by means of suitable collars 271—271.

The control unit 266 is adapted for axial movement upon the shaft 268 and, on occasion, is rotated independently of the said shaft by being provided with a coupling-tongue 272 slidable longitudinally in a coupling-notch 273 formed in the hub 274 of a gear-wheel 275.

The gear-wheel 275, which is rigidly secured to the shaft 268 for rotation therewith by means of a pin 276, is meshed into and driven by a gear-wheel 277 which latter is rigidly attached to the gear-wheel 252, before referred to, and hence rigidly attached to the shaft 232. It is to be noted that the shaft 268 is thus rotated from the shaft 247 and hence the control-unit 266 is adapted to be rotated at rates of speed varying in proportion to changes in speed of the vehicle.

The control-unit 266 is provided with an offsetting arm 278 carrying a roller 279 coacting with the adjacent edge 280 of the control-unit 267. The control-unit 267 is of cup-shaped form and is provided in its edge 280 with a notch 281 having one wall 282 extending substantially parallel with the axis of the shaft 268 and providing a driving-abutment for engagement on occasion by the roller 279. The said notch 281 also has an inclined cam-surface 283, for the purpose as will hereinafter appear.

The control-unit 267 carries adjacent its notch 281 a bridging-member 284 having a bifurcated inner end straddling the flange of the said control-unit 267 and pivotally secured thereto by means of a pivot-pin 285. The outer end of the said bridging-member 284 is shaped and proportioned to substantially fully bridge over the notch 281 in the control-unit 267 when the said bridging-member is swung into the position in which it is indicated in Fig. 4. For the purpose of normally holding the bridging-member 284 in its open position in which it is indicated in Fig. 1, a helical spring 286 is employed, one end of which is attached to the said bridging-member and the opposite end of which is attached to the adjacent surface of the control-unit 267.

An outer clutch-member 288 is formed integral with the control-unit 267 and both are mounted upon the shaft 268 with freedom for rotary movement with respect thereto. The outer clutch-member 288 cooperates with an inner clutch-member 289 corresponding to the inner clutch-members 219 and 262 previously described. The inner clutch-member 289 is rigidly attached to a gear-wheel 290 having a relatively-long hub 291 and mounted upon the shaft 268 with freedom for relative rotary movement with respect thereto. The outer clutch-member 288 and the inner clutch-member 289 form the main features of a one-way clutch which will, on occasion, drive the control-unit 267 in the direction indicated.

The gear-wheel 290 meshes into and is driven by the gear-wheel 231, and hence by the electric motor 237, but at a rate of speed one-third the speed at which the gear-wheel 231 rotates. The ratio of the gear-wheels 275 and 277, previously described, determines the vehicle speed at which the speed of the shaft 268 corresponds to the speed of the said gear-wheel 290 and, in the present embodiment of the invention, the above stated condition exists when the vehicle speed is forwardly at the rate of twenty-five miles per hour.

Encircling the hub 274 of the gear-wheel 275 is a helical spring 292 bearing at one end against the adjacent face of the enlarged portion of the said gear-wheel 275 and bearing at its opposite end against the opposing face of the control-unit 266. To prevent the spring 292 from axially displacing the control-units 266 and 267, the clutch-members 288 and 289, and the gear-wheel 290, an antifriction thrust-bearing 293 is mounted upon the shaft 268 against the hub 291 of the said gear-wheel 290. The said antifriction thrust-bearing in turn rests against a collar 294 rigidly secured in any suitable manner to the shaft 268.

Bearing against the face of the control-unit 266 opposite the offsetting arm 278 thereof is a roller 295 provided on the outer end of the flexible blade 137 of the speed-operated control switch 138.

The hub 291 of the gear-wheel 290 has a cam 296 formed thereon, or rigidly secured thereto, which acts to periodically flex the blade 120 of the constant-speed flashing-switch 121 out of engagement with the contact 122. A second cam 297 is provided on the said hub 291 for rotation therewith and acts to periodically flex the blade 147 of the constant-speed locking-circuit control switch 148 into engagement with the contact 149 thereof. The said cam 297 acts to cause the blade 147 of the said switch 148 to dwell in engagement with the contact 149 for but a very brief interval as compared to the dwells, as occasioned by the cam 296, of the blade 120 of the constant-speed flashing-switch 121, which latter in the present embodiment of the invention endures for approximately half of each revolution of the said cams 296 and 297, and hence of the gear-wheel 290. The said cams 296 and 297 coact to effect results as will be hereinafter described in detail.

The actuating means for the flash-frequency-selector switch 132 includes a rod 298 which is adapted to be slidingly secured in a bushing 299 in the side wall of the transmission-housing 249 and so positioned that its inner end engages a gear-shifting slide 300 forming a usual feature of an automobile transmission and constituting the first-speed and reverse-speed slide thereof. A helical spring 301, which is mounted on the said rod 298 inside the transmission-housing 249, is retained in place by a collar 302 which latter is rigidly secured to the said rod 298 as indicated in Fig. 1. Thus the said spring 301 exerts a constant effort to engage the said rod 298 with the gear-shifting slide 300 which latter is provided with a recess 303 so positioned that when the said slide 300 is moved rearwardly by a conventional gear-shift lever 304, for shifting the transmission mechanism into reverse, the inner end of the said rod 298 enters the recess 303. As the blade 131 of the said switch 132 is held constantly against an insulating member 305, provided on the outer end of the rod 298, the inward movement of the said rod 298 acts to permit the engagement of the said blade 131 with the contact 133. It is to be noted that the spring 134 is connected at one end to the said blade 131 through the intermediary of an insulating member 306 while its opposite end is secured to the transmission-housing 249 in the position shown in Fig. 1.

In order that the following description of operation may be made clearer, it seems pertinent to here point out that the apparatus above described, on occasion, will cause the speed-indicating lights 104 and 105 to vary in flash-frequency and will also effect the steady energization of the speed-indicating light 105.

The apparatus above described, on occasion, will also effect the steady energization at less than maximum brilliancy of the speed-indicating light 161, while under another set of conditions flashes which vary in frequency in response to changes in the speed of the vehicle will be superimposed thereon.

With respect to the complementary left-direction lights 164 and 165 and the complementary right-direction lights 166 and 167, under one set of conditions, one group or the other of the same will be energized so as to provide what may be termed "steady" light, both alone and in conjunction with the energization of the speed-indicating light 161 as above described, and also with the concurrent flashing of both of the speed-indicating lights 104 and 105.

On other occasions, there will be effected the steady energization of the speed-indicating light 105 in conjunction with the concurrent steady energization of the left-direction light 164, or the complementary right-direction lights 166 and 167.

Furthermore, on another occasion, the speed-indicating light 105 will be caused to flash in substantial consonance with the complementary left-direction lights 164 and 165.

Thus numerous combinations of signals may be provided with the apparatus illustrated to indicate to an extraneous observer the conditions under which a vehicle is being operated, including the settings of certain operating members of the vehicle whether the same is in motion or at a standstill.

For the purpose of a clearer understanding of certain of the various combinations of signals and the effects which the setting of the various operating features of the vehicle may have thereon, reference may be had to the graphic charts shown in Figs. 6 to 29 inclusive, the symbols of which will be hereinafter described in detail.

For the purpose c description, let it be presumed that the vehicle is at a standstill and the operator has operated the ignition switch 59 into its "on" position, and further that the transmission mechanism is in the neutral position, while the direction-signal switch 168 is also in the neutral position, the accelerator-pedal 94 being in the idle position.

Under the conditions just recited, a circuit is established from the storage battery 50, wire 53, ammeter 55, wire 57, blade 58 of the ignition switch 59, contact 68, to wire 70. Through the circuit just described, current will be supplied to the electric motor 237, the circuit being completed from the said wire 70, wire 239, the circuits of the said electric motor 237, to ground. Thus the electric motor 237 will be caused to operate at its predetermined rate of speed, which in the present instance is a speed sufficient to drive the gear-wheel 231 at a speed corresponding to the speed at which the shaft 232 would, under other circumstances, be driven directly by the movement of the vehicle when the same is operating forwardly at a rate of speed of forty miles per hour.

With the gear-wheel 231 rotating at the forty miles per hour rate of speed, the rotary cam-head 255 is caused to rotate at the rate of speed corresponding to that of the said gear-wheel 231 through the intermediary of the one-way clutch which latter includes the outer and inner clutch-members 259 and 262. The cam-head 255 rotating, as it does, is periodically slid rearwardly by the consecutive engagement of the cam-lugs 260—260 with the cam-lug 261 of the cam-head 251 four times during each revolution of the said cam-head 255 with respect to the shaft 232, which latter under the present circumstances is stationary. This reciprocation of the said cam-head 255 in turn effects the flexing of the blade 127 of the main flashing-switch 126 to thus cause the said blade 127 to engage with the contact 125 for relatively brief intervals four times during each revolution of the said cam-head 255, and hence of the gear-wheel 231.

At the same time that the main flashing-switch 126 is being operated as just described, the electric motor 237 acting through the intermediary of the gear-wheel 231 causes the gear-wheel 290 to rotate once for each three revolutions of the said gear-wheel 231. The gear-wheel 290 rotating as it does drives the control-unit 267 through the intermediary of the one-way clutch, which latter includes the outer and inner clutch-members 288 and 289.

The vehicle being at a standstill, rotary movement of the control-unit 266 is not being effected. Under the conditions now being described, therefore, the bridging-member 284, which normally is maintained in the position indicated in Fig. 1, will overtake and engage the roller 279, and will be swung thereby into the position indicated in Fig. 4. Thus, the bridging-member 284 will close the notch 281, as indicated in Fig. 4 and prevent the said roller 279 from entering the said notch 281. The rotary movement of the control-unit 267, under these conditions, serves to maintain the blade 137 of the speed-operated control switch 138 in a flexed position to engage the said blade 137 with the contacts 139 and 140 to complete circuits as will be hereinafter described in detail.

The cam 296, provided upon the hub 291 of the gear-wheel 290 for rotation therewith, causes the flexible blade 120 of the constant-speed flashing-switch 121 to engage the contact 122 thereof once during each three revolutions of the gear-wheel 231.

Attention may be here called to the fact that, under the conditions above described, the blade 127 of the main flashing-switch 126 dwells in engagement with the contact 125 for but very brief intervals as compared to the dwells of the blade 120 of the said constant-speed flashing-switch 121 with the contact 122, which latter endures for approximately half of each revolution of the cams 296 and 297.

Thus under the conditions above described, with the main flashing-switch 126 operating in conjunction with the constant-speed flashing-switch 121, the electromagnet 117 will be periodically energized, the circuit being completed from the wire 70, through wire 87, contact 88 of the accelerator-operated control switch 90, blade 89, wire 96, wire 115, coil 116 of the said electromagnet 117, wire 119, blade 120 of the constant-speed flashing-switch 121, contact 122, wire 124, contact 125 of the main flashing-switch 126, blade 127, wire 128, to ground. The blade 137 of the speed-operated control switch 138 being in a flexed position to engage the said blade 137 with the contacts 139 and 140, as previously described, a parallel circuit exists from the said wire 70, through wire 136, blade 137, contact 140, wire 141, to the said wire 96.

Energization of the circuits just described causes the electromagnet 117 to move the blade 97 of the selecting-switch 98 out of engagement with the contact 100 and into engagement with the contact 99 to establish a circuit from the wire 96, through the said blade 97, the said contact 99, wire 107, blade 108 of the speed-indicating-direction-signal selecting-switch 109, contact 111, wire 113, speed-indicating light 104, to ground.

During the time intervals that the main flashing-switch and/or the constant-speed flashing-switch 121 are acting to interrupt the flow of current through the said electromagnet 117, the blade 97 of the selecting-switch 98 dwells in engagement with the contact 100 and completes the circuit from the wire 96, through the said blade 97, the said contact 100, wire 102, contact 92 of the accelerator-operated control switch 90, blade 91, wire 103, speed-indicating light 105, to ground.

Under the above described conditions, therefore, during one revolution of the cams 296 and 297, the speed-indicating light 105 will be caused, during a given half-cycle of operation of the said cams, to be energized during all of such half-cycle. The next half-cycle of operation will cause the alternate flashing of the speed-indicating lights 104 and 105 for periods of very brief duration as compared to the longer energization of the said speed-indicating light 105 occasioned during all of a half-cycle of operation of the said cams 296 and 297. The shaft 232 being stationary under the circumstances as just above described, the brief flashes of the speed-indicating light 104 will be six in number thus indicating that the vehicle is at a standstill.

To insure that the first flash of the said speed-indicating light 104, during a given cycle of operation, will be equal in duration to the succeeding flash thereof, the locking-circuit means is provided and acts as will be now described in detail. When the blade 127 of the main flashing-switch 126 is in engagement with the contact 125 just previous to the instant that the cam 296 acts to allow the engagement of the blade 120 of the constant-speed flashing-switch 121 with the contact 122 thereof, the engagement of the blade 147 of the locking-circuit control switch 148 with the contact 149, occasioned by the action of the cam 297, establishes a circuit interconnecting the battery 50 with the electromagnet 144 for the purpose of energizing the latter. While the speed of the vehicle is less than twenty-five miles per hour, the blade 137 of the speed-operated control switch 138 engages the contacts 139 and 140, as previously described, thus the completed circuit exists from the wire 70, through wire 136, the said blade 137, contact 139, wire 142, coil 143 of the electromagnet 144, wire 146, blade 147 of the locking-circuit control switch 148, contact 149, wire 150, wire 124, contact 125 of the main flashing-switch 126, blade 127, wire 128, to ground.

Energization of the circuit just described causes the electromagnet 144 to move the blade 152 of the switch 151 into engagement with the contact 153 thereof for the purpose of maintaining the energization of the said electromagnet 144 after the cam 297 has acted to allow the blade 147 of the control switch 148 to move out of engagement with the contact 149. Under the condition just described, the energization of the said electromagnet 144 is maintained until the blade 127 of the main flashing-switch 126 operates to open the circuit.

During the time interval that the electromagnet 144 remains energized, the blade 152 engages the blade 120 of the constant-speed flashing-switch 121 to prevent the said blade 120 from moving into engagement with the contact 122 when released by the action of the cam 296. Thus the first energization of the electromagnet 117 during a given half-cycle of operation of the cams 296 and 297 is delayed for but a very brief time interval to insure that the first flash of the speed-indicating light 104 will be equal in duration to the succeeding flash thereof.

With respect to the auxiliary speed-indicating light 161, at the same time that the various means are being operated as previously described, the electric motor 237 acting through the intermediary of the gear-wheel 231 causes the gear-wheel 220 to rotate once for each three revolutions of the said gear-wheel 231 and, therefore, at a speed equal to the speed at which the gear-wheel 290 is similarly driven. The gear-wheel 220 rotating as it does drives the rotary cam-head 206 at the rate of speed corresponding to that of the said gear-wheel 220 through the intermediary of the one-way clutch which latter includes the outer and inner clutch-members 217 and 219. The cam-head 206 rotating as it does, is periodically slid rearwardly by the coaction of the cam-lugs 212 and 213 twice for each revolution of the said cam-head 206 with respect to the shaft 208, which latter under the present circumstances is stationary. This reciprocating of the cam-head 206 in turn effects the flexing of the blade 71 of the auxiliary flashing-switch 72 to thus cause the said blade 71 to engage with the contact 73 for relatively brief intervals twice during each revolution of the said cam-head 206, and hence of the gear-wheel 220.

It is evident, therefore, that when the blade 71 of the auxiliary flashing-switch 72 is in engagement with the contact 73, a circuit exists from the wire 70, the said blade 71, the said contact 73, wire 163, wire 160, auxiliary speed-indicating light 161, to ground. Also under the conditions just described, the blade 137 of the speed-operated control switch 138 being in a flexed position to engage the said blade 137 with the contacts 139 and 140, a parallel circuit exists from the said wire 70, through wire 136, blade 137, contact 139, wire 142, wire 158, resistance unit 159, to the said wire 160.

Thus during the time interval that the blade 71 of the flashing-switch 72 is out of engagement with the contact 73, the auxiliary speed-indicating light 161 will be energized through the resistance unit 159 to cause the steady illumination thereof at less than maximum brilliancy. The engagement of the blade 71 of the flashing-switch 72 with the contact 73 provides a circuit of much less resistance than the circuit through the resistance unit 159, thus at some variable point during each half-cycle of operation of the constant-speed flashing-switch 121, the said auxiliary speed-indicating light 161 will be periodically energized to cause the illumination at the maximum brilliancy thereof for a period of brief duration as compared to the half-cycle energization of the speed-indicating light 105 occasioned as previously described. The energization of the auxiliary speed-indicating light 161 in conjunction with the energization of the various other signal lights provides means of indicating slight movement of the vehicle as will be described in detail as the description of operation progresses to include other of the numerous signal indications which the present invention provides.

Attention may be now directed to the significance of the accompanying charts, Fig. 7 of which graphically represents the conditions just above described. The gap between the lateral broken-line boundaries represents one complete revolution or cycle of the cams 296 and 297, and hence of the constant-speed flashing-switch 121. It will be noted that, as indicated in Fig. 7 referred to, the speed-indicating lights 104 and 105 are alternately energized during the first half-cycle indicated, while the speed-indicating light 105 is energized during all of the succeeding half-cycle. It will also be noted that the speed-indicating light 161 is energized to effect the very brief illumination thereof at maximum brilliancy, by the operation of the auxiliary flashing-switch 72, once during each half-cycle of operation indicated. As also indicated in Fig. 7 referred to, the speed-indicating light 161 is energized to cause the illumination at less than maximum brilliancy during the time interval between each flash of maximum brilliancy thereof.

Individual settings of the operating members of the vehicle are indicated in Fig. 7 as well as in the other charts. It is also indicated that certain of the settings are optional.

As a logical next step in the operation of the vehicle, let it be presumed that the operator now proposes to put the vehicle in motion in a direction forwardly and to the right. Under these conditions and before any operation is performed to actually put the vehicle in motion, the operator would operate the blade 169 of the direction-signal switch 168 to the right to engage the same with the contact 171. Thus a circuit is established from the blade 58 of the ignition switch 59, through contact 67, wire 69, wire 172, the said blade 169, the said contact 171, wire 201, right-direction light 166, to ground, and the said wire 201, through wire 203, right-direction light 167, to ground.

The energization of the circuits just described effects the study illumination of the right-direction lights 166 and 167 thus supplementing the signal indications previously described to indicate the intended movement of the vehicle in a direction forwardly and to the right, all as indicated in Fig. 8.

In the event that the operator of the vehicle should have intended causing the movement of the vehicle in a direction both forwardly and to the left, instead of in a direction forwardly and to the right as just described, the operator, under such conditions and before putting the vehicle in motion, would have operated the blade 169 of the direction-signal switch 168 to the left to engage the said blade 169 with the contact 170. Thus a control circuit is established from the blade 58 of the ignition switch 59, through contact 67, wire 69, wire 172, the said blade 169, the said contact 170, wire 173, wire 178, coil 188 of the electromagnet 189, wire 191, contact 192 of the direction-light periodicity-control switch 193, blade 194, to ground.

By this action, the electromagnet 189, will be energized with the effect of moving the blade 174 of the constant-brilliancy cutout-switch 175 out of engagement with its complementary contact 176, and simultaneously moving the blade 108 of the speed-indicating-direction-signal selecting-switch 109 out of engagement with the contact 111 and into engagement with the contact 110. This movement of the blades 108 and 174 by the action of the electromagnet 189, as just described, opens the circuit to the speed-indicating light 104 and establishes a circuit from the wire 107, through the said blade 108, the said contact 110, wire 196, coil 197 of the electromagnet 198, to ground.

Energization of the circuit just established causes the electromagnet 198 to move the blade 179 of the direction-signal selecting-switch 180 out of engagement with the contact 181 and into engagement with the contact 182 to establish a circuit from the wire 178, through the said blade 179, the said contact 182, wire 186, left-direction light 165, to ground.

During the time intervals that the main flashing-switch 126 and/or the constant-speed flashing-switch 121 are acting to interrupt the flow of current through the electromagnet 117 and thus in turn through the electromagnet 198, the blade 179 of the switch 180, dwells in engagement with the contact 181 and completes the circuit from the wire 172, through the blade 169 of the direction-signal switch 168, contact 170, wire 173, wire 178, the said blade 179, the said contact 181, wire 184, left-direction light 164, to ground.

The action of the electromagnet 189, as just described, cuts out the speed-indicating light 104 and substitutes therefor the left-direction lights 164 and 165 which latter will be flashed alternately with the speed-indicating light 105 during the half-cycle of operation in which the said speed-indicating light 104 was caused to flash, as before described previously to the operation of the blade 169 of the direction-signal switch 168. The said left-direction light 164 will be flashed concurrently with the said speed-indicating light 105, it being understood that the flashing of the latter is not changed by the operation of the direction-signal switch 168.

Thus under the conditions just above described, an indication of the intended travel of the vehicle in a direction forwardly and to the left is provided with the other indications as before described, as indicated in Fig. 9.

Having described the character of the signals provided when the vehicle is at a standstill with various settings of the direction-signal switch 168 and the transmission mechanism other than in the reverse position, let it now be presumed that the vehicle is caused to be moved forwardly by an appropriate operation of the transmission mechanism, clutch, etc., and the depression of the accelerator-pedal 94, the blade 169 of the direction-signal switch 168 having been operated to its neutral position.

The depression of the accelerator-pedal 94 moves the blade 89 of the control switch 90 out of engagement with the contact 88, and also moves the blade 91 of the said control switch 90 out of engagement with the contact 92 and into engagement with the contact 93. The movement of the said blade 91, as just described, establishes a circuit from the wire 107, through wire 107ᵃ, the said contact 93, the said blade 91, wire 103, speed-indicating light 105, to ground, thus the engagement of the blade 97 of the selecting-switch 98 with the contact 100 thereof does not, under the present set-up of the apparatus, effect the energization of the speed-indicating light 105.

Concurrently with the depression of the accelerator-pedal 94 and the resulting operation of the control switch 90, the blade 194 of the direction-light periodicity-control switch 193 will be moved out of engagement with the contact 192 thereof to thus interrupt the circuit through the coil 188 of the electromagnet 189, which insures that the said electromagnet 189 will not be energized when the blade 169 of the direction-signal switch 168 is moved to the left and into engagement with the contact 170. This condition insures the steady illumination of the left direction-lights 164 and 165 when the direction-signal switch 168 is subsequently closed.

When the vehicle is in motion forwardly, as described, the shaft 232 instead of remaining stationary, as theretofore, will now be rotated by the movement of the vehicle itself and in the same direction as the direction in which the gear-wheel 231 is being driven under the urge of the electric motor 237. Thus as the vehicle increases its rate of speed, the relative speeds between the rotary cam-head 251 and the rotary cam-head 255 will be proportionately lessened, with the result that the operation of the main flashing-switch 126 will occur with decreasing frequencies.

Thus under the conditions just described, with the main flashing-switch 126 operating as it does in conjunction with the constant-speed flashing-switch 121, it acts, during a given half-cycle of operation of the cams 296 and 297, to cause the concurrent flashing of the speed-indicating lights 104 and 105 at frequency-rates which are inversely proportional to the forward speed of the vehicle, that is, flashes occur with progressively-decreasing frequency as the forward speed of the vehicle increases.

It is to be noted that when the vehicle is in motion forwardly as described, the shaft 268 instead of remaining stationary, as theretofore, will also be rotated by the movement of the vehicle and in the same direction as the direction in which the gear-wheel 290 is being driven under the urge of the electric motor 237. As the vehicle increases its forward speed to the twenty-five miles per hour rate, the relative speeds between the control-units 266 and 267 will be proportionately lessened but it is readily apparent that the bridging-member 284 will continue to overtake and engage the roller 279 and the notch 281 will be repeatedly closed in the manner as previously described. Thus the blade 137 of the speed-operated control switch 138 will be maintained in a flexed position to engage the said blade 137 with the contacts 139 and 140 thereof.

The locking-circuit means acts, as previously described, to delay the operation of the constant-speed flashing-switch 121 for but a very brief time interval to, under the present set-up of the apparatus, insure that the first flash of the speed-indicating lights 104 and 105, during the given half-cycle of operation last referred to, will be equal in duration to the succeeding flash thereof, it being presumed that the speed of the vehicle remains constant during such half-cycle of operation.

During the next half-cycle of operation of the cams 296 and 297, the constant-speed flashing-switch 121 acts to interrupt the flow of current through the coil 116 of the electromagnet 117, therefore, the said electromagnet 117 is de-energized and the blade 97 of the selecting-switch 98 is maintained out of engagement with the contact 99 by the action of the spring 101. Thus, the speed-indicating lights 104 and 105 are not energized, under the present conditions, during the half-cycle of operation last referred to.

With respect to the auxiliary speed-indicating light 161, at the same time that the speed-indicating lights 104 and 105 are being concurrently flashed as above described, the shaft 208 instead of remaining stationary as theretofore, will now be rotated by the movement of the vehicle through the intermediary of the gear-wheels 252 and 253 and in the same direction as the direction in which the gear-wheel 220 is being driven under the urge of the electric motor 237 through the intermediary of the gear-wheel 231. Thus as the vehicle increases its forward rate of speed up to the ten miles per hour rate previously referred to, the relative speeds between the rotary cam-head 205 and the rotary cam-head 206 will be proportionately lessened, with the result that the operation of the auxiliary flashing-switch 72 will occur with decreasing frequencies, and the time at which the circuit is closed by the said flashing-switch 72 will shift with respect to the time at which the main flashing-switch 126 and the constant-speed flashing-switch 121 act to effect the energization of the speed-indicating lights 104 and 105 as just above described.

Thus under the conditions just described, the auxiliary flashing-switch 72 will cause the flashing at maximum brilliancy of the auxiliary speed-indicating light 161 at frequency-rates which are inversely proportional to the forward speed of the vehicle, that is, flashes occur with progressively-decreasing frequency as the vehicle increases its forward speed up to the ten miles per hour rate previously referred to. It is evident, therefore, that slight travel of the vehicle will cause an appreciable change of time of flash of the auxiliary speed-indicating light 161 with respect to any given time during a cycle of operation of the constant-speed flashing-switch 121. While the vehicle remains at a standstill and its operating members are maintained in the positions last described, the signal indicated in Fig. 10 will be effected.

When in the increasing of the speed of the vehicle, the speed thereof reaches ten miles per hour, the shaft 208 will then be rotating at the same speed as that at which the gear-wheel 220 is being rotated under the urge of the electric motor 237, whereupon no further relative movement will occur between the rotary cam-heads 205 and 206, so that the said cam-head 206 will no longer be reciprocated and hence the auxiliary flashing-switch 72 will cease to be operated.

As the speed of the vehicle increases above ten miles per hour, the flat face of the cam-lug 213 of the cam-head 205 will engage the flat face of one of the cam-lugs 212 of the cam-head 206 and thus cause the shaft 208 to drive the said cam-head 206, and hence the outer clutch-member 217, at a one to one ratio and in consonance with the speed of the vehicle. Under such conditions, the one-way clutch acts to allow the said cam-head 206 to rotate at higher rates of speed with respect to the speed at which, under other conditions, it would be rotated under the urge of the electric motor 237. Thus the gear-wheel 220 is permitted to continue to rotate at its predetermined constant rate of speed under the urge of the electric motor 237 while the said cam-head 206 changes in speed in consonance with the speed of the vehicle.

Under the conditions now being described, the auxiliary flashing-switch 72 is out of action but energization of the auxiliary speed-indicating light 161 through the resistance unit 159 maintains the steady illumination at less than maximum brilliancy of the said speed-indicating light 161 until such time as the vehicle has attained a speed forwardly at the rate of twenty-five miles per hour. Therefore, under the present conditions, the signal given between the rate of speed of ten miles per hour and the rate of speed of twenty-five miles per hour consists of the concurrent flashing of the speed-indicating lights 104 and 105 at frequency-rates which are inversely proportional to the forward speed of the vehicle during one half-cycle of operation of the cams 296 and 297, as previously described, supplemented by the steady illumination at less than maximum brilliancy of the auxiliary speed-indicating light 161. When the forward speed of the vehicle becomes twenty-one miles per hour, the speed-indicating lights 104 and 105 are concurrently flashed three times during the half-cycle of operation just referred to, as indicated in Fig. 11.

If during the forward movement of the vehicle at less than twenty-five miles per hour, under the above recited conditions, the operator proposes to turn the vehicle to the right, the blade 169 of the direction-signal switch 168 would be operated to the right to engage the said blade 169 with the contact 171 for the purpose of re-establishing the circuits to the right-direction lights 166 and 167, the circuits involved having been previously described in detail. The energization of these circuits effects the steady illumination of the said right-direction lights 166 and 167 thus supplementing the illumination of the speed-indicating lights 104, 105 and 161 which exists at any given forward rate of speed of the vehicle at less than twenty-five miles per hour, to include with the signal indication of rate of speed and setting of various control members, the signal indication of the turning of the vehicle in the direction to the right. The signals effected, at the rate of speed of twenty-one miles per hour, under the conditions last described are indicated in Fig. 12.

In the event that the operator of the vehicle should have intended causing the movement of the vehicle in a direction to the left, instead of in a direction to the right under the conditions just described, the operator would have operated the blade 169 of the direction-signal switch 168 to the left to engage the said blade 169 with the contact 170 thereof. The blade 194 of the direction-light periodicity-control switch 193 is out of engagement with the contact 192, therefore, the electromagnet 189 is not energized. Thus the blade 174 of the constant-brilliancy cutout-switch 175 is maintained in engagement with the contact 176 and a circuit exists from the wire 69, through wire 172, the blade 169 of the direction-signal switch 168, contact 170, wire 173, the said blade 174 of the switch 175, the said contact 176, wire 186ᵃ, wire 186, left-direction light 165, to ground. A circuit also exists from the said wire 173, wire 178, blade 179 of the direction-signal selecting-switch 180, contact 181, wire 184, left-direction light 164, to ground.

The energization of the circuits just described effects the steady illumination of the said left-direction lights 164 and 165 thus supplementing the illumination of the speed-indicating lights 104, 105 and 161 which exists at any given forward rate of speed of the vehicle at less than twenty-five miles per hour to include the signal indication of the turning of the vehicle in the direction to the left. The signals effected, at the rate of speed of twenty-one miles per hour, under the conditions now being described are indicated in Fig. 13.

Now that the vehicle has attained a forward speed of twenty-five miles per hour, or slightly more, let it be presumed that the vehicle is turned in the straight-ahead direction rather than in a direction forwardly and to the left as before. Under these conditions, the blade 169 of the direction-signal switch 168 will be operated to its neutral position to thus cut the left-direction lights 164 and 165 out of action.

Under the conditions now being described, the shaft 268, which has been rotating at increasing rates of speed by the forward movement of the vehicle and in the same direction in which the gear-wheel 290 is being driven under the urge of the electric motor 237, is rotating at the same speed as the said gear-wheel 290. A slightly higher rate of speed of the vehicle will cause the speed of the shaft 268 to exceed the speed of the gear-wheel 290, thus the roller 279 of the control-unit 266 will advance along the edge 280 of the control-unit 267 and will, under the urge of the spring 292, ride down, so to speak, the cam-surface 283 of the notch 281 therein and contact with the driving-abutment 282. The control-unit 267 will now be driven by the control-unit 266 at a rate of speed corresponding to and changing with the speed of the shaft 268.

It will be understood that the control-unit 266 will be permitted to drive the control-unit 267 at greater rates of speed than the speed of the gear-wheel 290, which normally drives the latter owing to the action of the one-way clutch which comprises in the main, as before noted, the outer and inner clutch-members 288 and 289. Under the condition just recited the outer clutch-member 288 will freely ride ahead of the inner clutch-member 289 owing to the retirement of the clutch-balls in the usual manner of one-way clutches of this type.

As the roller 279 of the control-unit 266 enters the notch 281, as just above described, the said control-unit 266 will move axially toward the control-unit 267 under the urge of the spring 292, with the effect of the movement of the blade 137 of the speed-operated control switch 138 out of engagement with the contacts 139 and 140.

By this action, the only-now-existing circuits to the speed-indicating lights 104, 105 and 161 are interrupted, whereby the energization of the same will be, from this point on, discontinued until such time as another set-up of the apparatus is made in the manner as will be hereinafter described.

If during the forward movement of the vehicle at rates of speed in excess of twenty-five miles per hour, it is desired to make a turn, the blade 169 of the direction-signal switch 168 will be operated either to the left or right, as the case may be, whereupon either the left-direction lights 164 and 165 or the right-direction lights 166 and 167 will be steadily illuminated, the energization of the same being effected through the circuits which have been previously described. The signals effected as above described are graphically represented in Figs. 15 and 14 respectively.

While, in the present embodiment of the invention, energization of the speed-indicating lights 104, 105 and 161 is not effected during the forward movement of the vehicle at rates of speed in excess of twenty-five miles per hour, when the accelerator-pedal 94 is in the depressed position, the main flashing-switch 126 is actuated in the manner as will now be described.

When in the increasing speed of the vehicle, the speed thereof reaches forty miles per hour, the shaft 232, which has been rotating at increasing rates of speed by the movement of the vehicle and in the same direction as the direction in which the gear-wheel 231 is being driven under the urge of the electric motor 237, is rotating at the same speed as the said gear-wheel 231. It will be understood, therefore, that a slightly higher rate of speed of the vehicle will cause the speed of the said shaft 232 to exceed the speed of the said gear-wheel 231, whereupon, the flat face of the cam-lug 261 of the rotary cam-head 251 will engage the flat face of one of the four cam-lugs 260—260 of the rotary cam-head 255. The cam-head 255 will now be driven by the cam-head 251 at a rate of speed corresponding to and changing with the speed of the shaft 232.

Under the condition just recited the outer clutch-member 259 will freely ride ahead of the inner clutch-member 262 owing to the retirement of the clutch-balls in the usual manner of one-way clutches of this type.

Under the conditions now being described, no further relative rotary movement will occur between the cam-heads 251 and 255, so that the said cam-head 255 will no longer be reciprocated and hence the main flashing-switch 126 will cease to be operated. It is evident, therefore, that the blade 127 of the said main flashing-switch 126 is maintained out of engagement with the contact 125 and energization of the coil 116 of the electro-magnet 117 can not be effected while the vehicle is being operated forwardly at rates of speed in excess of forty miles per hour.

In the foregoing description of operation of the vehicle in a forward direction, it has been presumed that the accelerator-pedal 94 has been depressed, as before stated, to cause the active forward propulsion of the vehicle.

For the purpose of description, let it be presumed that the vehicle is being operated forwardly at a rate of speed in excess of forty miles per hour. Now if the operator desires to decrease the speed of the vehicle, the said operator will remove pressure from the said accelerator-pedal 94 to permit the same to be retired by its spring 95 to thus return the blade 89 of the control switch 90 into engagement with the contact 88, and simultaneously move the blade 91 of the said control switch 90 out of engagement with the contact 93 and into engagement with the contact 92. By this action, with the resulting operation of the said control switch 90, the blade 194 of the direction-light periodicity-control switch 193 will be concurrently moved into engagement with the contact 192 thereof to re-establish the flow of current through the electromagnet 189 when the blade 169 of the direction-signal switch 168 is subsequently moved to the left and into engagement with the contact 170.

The removal of pressure from the accelerator-pedal 94 and the consequent movement of the blade 89 of the control switch 90, as above described, will re-establish the circuit from the wire 70 to the selecting-switch 98. Under the conditions now being described, the blade 127 of the main flashing-switch 126 is being maintained out of engagement with the contact 125 thereof as has been previously stated. The electro-magnet 117, therefore, remains deenergized and the blade 97 of the said selecting-switch 98 is maintained in engagement with the contact 100 by the action of the spring 101. The blade 91 of the control switch 90 being in engagement with the contact 92, the circuit to the speed-indicating light 105 is re-established and remains closed until, under other conditions to be described, it is interrupted by the action of the main flashing-switch 126 and/or the constant-speed flashing-switch 121. The resulting steady illumination of the speed-indicating light 105 indicates that pressure has been removed from the accelerator-pedal 94 and the vehicle is being operated forwardly in a straight-ahead direction at a rate of speed in excess of forty miles per hour. The signal effected as just described is graphically indicated in Fig. 17.

If during the diminution in speed of the vehicle as above described to not less than forty miles per hour, the blade 169 of the direction-signal switch 168 should be operated to the right for instance, the steady illumination of the right-direction lights 166 and 167 will be effected thus supplementing the steady illumination of the speed-indicating light 105 to also indicate the movement of the vehicle in a direction forwardly and to the right, as indicated in Fig. 18.

If on the other hand the blade 169 of the direction-signal switch 168 should be operated to the left during the diminution of the speed of the vehicle to not less than forty miles per hour, under the conditions just referred to, the electromagnet 189 will be energized to shift the switch-blades 108 and 174. The steady illumination of the left-direction light 164 will be effected thus supplementing the steady illumination of the speed-indicating light 105 to also indicate the movement of the vehicle in a direction forwardly and to the left at a rate of speed in excess of forty miles per hour, as indicated in Fig. 19.

When in the slowing up of the vehicle, the same reaches a speed of slightly less than forty miles per hour, let it be presumed that the vehicle is turned in a straight-ahead direction rather than in a direction forwardly and to the left as before. At the rate of speed slightly less than forty miles per hour, the shaft 232 will be caused to rotate by the movement of the vehicle at a rate of speed slightly less than the rate of speed at which the gear-wheel 231 is being driven under the urge of the electric motor 237. Therefore, the rotary cam-head 255 is again being driven by the said gear-wheel 231 at a rate of speed in consonance therewith. The small speed differential which now exists between the said shaft 232 and the said gear-wheel 231 will occasion the relatively slow reciprocation of the cam-head 255 and hence the closing and opening of the main flashing-switch 126.

The main flashing-switch 126 operating in conjunction with the operation of the constant-speed flashing-switch 121 as it does, effects the relatively slow alternate energization of the speed-indicating lights 104 and 105. Under the conditions now being described, the flashes of the speed-indicating light 104 are substantially equal to the flashes of the speed-indicating light 105, each flash enduring for a time interval substantially equal to a half-cycle of operation of the cams 296 and 297. The signal effected, at the rate of speed of thirty-five miles per hour, under the conditions now being described is indicated in Fig. 20.

If during the forward movement of the vehicle at the rate of speed of thirty-five miles per hour under the conditions now being described, the blade 169 of the direction-signal switch 168 should be operated to indicate a left direction of travel, the speed-indicating light 104 will cease flashing in conjunction with the speed-indicating light 105, and the left-direction light 165 will be substituted therefor, as indicated in Fig. 21. Incidentally, the left-direction light 164 will be energized concurrently with the speed-indicating light 105, as indicated in Fig. 21 referred to.

Let it now be presumed that the rate of speed of the vehicle continues to decrease under the conditions just above described. The further diminution in speed of the vehicle causes the relative speeds between the cam-head 251 and the cam-head 255 to be proportionately increased, with the result that the operation of the main flashing-switch 126 will occur with correspondingly increasing frequencies.

Thus, under the above recited conditions, during the half-cycle of operation of the cams 296 and 297 when the blade 120 of the constant-speed flashing-switch 121 is in engagement with the contact 122 thereof, the speed-indicating lights 104 and 105 will be alternately flashed by the action of the main flashing-switch 126. It is to be noted that the said speed-indicating lights 104 and 105 will be caused, during the half-cycle of operation just referred to, to flash at frequency-rates which are inversely proportional to the forward speed of vehicle, that is, flashes occur with progressively-increasing frequency as the forward speed of the vehicle decreases.

When the rate of speed of the vehicle is again twenty-one miles per hour, the flashes of the speed-indicating light 104 will be three in number, as graphically represented in Fig. 22, thus indicating to an observer that the vehicle is traveling forwardly at the above stated rate of speed.

When in the diminution of the speed of the vehicle, the speed thereof is less than twenty-five miles per hour, the locking circuit means acts, as previously described, to delay the operation of the constant-speed flashing-switch 121 for but a very brief time interval to, under the present set-up of the apparatus, insure that the first flash of the speed-indicating light 104, during the half-cycle of operation just referred to, will be equal in duration to the succeeding flash thereof.

The next half-cycle of operation of the cams 296 and 297, and hence of the constant-speed flashing-switch 121, will cause the speed-indicating light 105 to be energized during all of such half-cycle, as indicated in Fig. 22 referred to.

When in the diminution in speed of the vehicle, the same reaches a speed of slightly less than twenty-five miles per hour, the speed of the control-unit 266 decreases below the speed of the gear-wheel 290 with the effect that the control-unit 267 will move ahead of the said control-unit 266 under the urge of the electric motor 237, thereby causing the roller 279 to ride up the sloping wall or cam-surface 283, thus in turn causing the said control-unit 266 to move axially away from the control-unit 267 against the counter urge of the spring 292. This movement of the control-unit 266 results in the engagement of the blade 137 of the speed-operated control switch 138 with the contacts 139 and 140 thereof.

By this action, the energization of the speed-indicating lights 104 and 105 between the rate of speed of ten miles per hour and the rate of speed of twenty-five miles per hour will be supplemented by the steady illumination at less than maximum brilliancy of the auxiliary speed-indicating light 161, as also indicated in Fig. 22 referred to.

When the rate of speed of the vehicle becomes less than ten miles per hour, the rotary cam-head 206 will again be reciprocated with the result that the operation of the auxiliary flashing-switch 72 will occur with proportionately increasing frequencies with further decreases in speed, and the time at which the circuit is closed by the said flashing-switch 72 will shift with respect to the time at which the main flashing-switch 126 and the constant-speed flashing-switch 121 act to effect the energization of the speed-indicating lights 104 and 105 as above described. Thus as the speed of the vehicle decreases more and more below the ten miles per hour rate, the auxiliary flashing-switch 72 will cause the flashing at maximum brilliancy of the said auxiliary speed-indicating light 161 at progressively increasing frequency.

If during the forward movement of the vehicle at rates of speed less than forty miles per hour with the accelerator-pedal 94 in the idle position, as just described, the blade 169 of the direction-signal switch 168 should be operated to the right, the steady illumination of the right-direction lights 166 and 167 will be effected thus supplementing the illumination of the speed-indicating lights 104, 105 and 161 which exists at any given forward rate of speed of the vehicle at less than forty miles per hour to include the signal indication of the turning of the vehicle in a direction to the right. The signals effected, at the rate of speed of twenty-one miles per hour, under the conditions now being described are indicated in Fig. 23.

If on the other hand the blade 169 of the direction-signal switch 168 should be operated to the left during the forward movement of the vehicle, under the conditions just referred to, the electromagnet 189 will be reenergized to shift the switch-blades 108 and 174 for the purpose of re-establishing circuits to the left-direction lights 164 and 165. Under the conditions now being described, the action of the said electromagnet 189 cuts out the speed-indicating light 104 and substitutes therefor the left-direction lights 164 and 165. The left-direction light 164 will be caused to flash concurrently with the speed-indicating light 105 during the half-cycle of operation of the cams 296 and 297 in which, under other circumstances, the said speed-indicating light 104 was caused to flash. The current-flow in the circuits reestablished by the operation of the said electromagnet 189 will also cause the said left-direction light 165 to be flashed alternately with the said lights 105 and 164. Under these conditions, an indication of the travel of the vehicle in a direction forwardly and to the left is provided with the other indications as before described, as indicated in Fig. 24.

When the forward movement of the vehicle entirely ceases and the same is stationary, the signals effected will be the standstill signals previously described until such time as other set-ups of the apparatus are effected in the manner as has been described or in the manner as will be now described.

Let it now be presumed that the vehicle is again at a standstill and that the operator has operated the transmission mechanism of the vehicle into its reverse position by an appropriate movement of the gear-shifting lever 304 to shift the gear-shifting slide 300 rearwardly, which movement allows the rod 298 to enter the recess 303 and results in the engagement of the blade 131 of the flash-frequency-control switch 132 with the contact 133 thereof.

The engagement of the said blade 131 with the said contact 133 serves to relieve the various circuits, which have been previously described, of dependence upon the constant-speed flashing-switch 121 and provides a circuit which is independent thereof from wire 119, through wire 130, the said blade 131, the said contact 133, wire 135, wire 124, contact 125 of the main flashing-switch 126, blade 127, wire 128, to ground. While the transmission mechanism is in the reverse position, therefore, the energization of the electromagnet 117 is entirely dependent on the operation of the main flashing-switch 126 instead of being dependent upon the joint operation of the said flashing-switch 126 and the constant-speed flashing-switch 121 as before.

Under the conditions now being described, with the accelerator-pedal 94 in the idle position and the direction-signal switch 168 in the neutral position, the electromagnet 117 operating at a constant frequency rate in consonance with the operation of the said main flashing-switch 126, as it does, effects the alternate energization of the speed-indicating lights 104 and 105, there being six flashes of each thereof during each half-cycle of operation of the cams 296 and 297, as graphically represented in Fig. 25.

While the movement of the said switch 132 has not changed the character of the flashes of the auxiliary speed-indicating light 161, as indicated in Fig. 25 referred to, the signal effected is much more conspicuous than the standstill signals previously described and serves, in the present embodiment of the invention, to indicate a condition of operation of the vehicle requiring additional caution, the intended reverse movement of the vehicle.

In Fig. 26 is represented the signals effected under the conditions just described save that the blade 169 of the direction-signal switch 168 has been operated to indicate the intended reverse travel of the vehicle in a direction to the right.

The operation of the blade 169 of the direction-signal switch 168 for the purpose of indicating the intended reverse travel of the vehicle in a direction to the left, under the conditions now being described, would cause the signals to be effected as graphically represented in Fig. 27.

Generally, the said switch 132 is provided as a unit of the signaling system to co-operate with the other units thereof to indicate any condition requiring more than the average degree of caution.

As a logical next step in the operation of the vehicle, let it be presumed that the operator acts to cause the reverse travel of the vehicle by an appropriate operation of the clutch, etc., and the depression of the accelerator-pedal 94.

Since the vehicle is now moving in the reverse direction, the shaft 232 will be caused to rotate in the direction opposite from normal and, therefore, opposite to the direction in which the gear-wheel 231 is being driven under the urge of the electric motor 237. The relative speeds between the rotary cam-head 251 and the rotary cam-head 255 are increased at a rate varying with the rate of reverse movement of the vehicle and are increased over those which can occur during the forward travel of the vehicle, with the result that the frequency of operation of the main flashing-switch 126 will be increased. Under the conditions now being described, the speed-indicating lights 104 and 105 will be concurrently flashed at a frequency rate in excess of six during each half-cycle of operation of the cams 296 and 297, the frequency rate in excess of six being controlled by the rate of reverse movement of the vehicle.

With respect to the auxiliary speed-indicating light 161, at the same time that the speed-indicating lights 104 and 105 are being concurrently flashed as just described, the shaft 208 also will be caused to rotate in the direction opposite from normal and, therefore, opposite to the direction in which the gear-wheel 220 is being driven under the urge of the electric motor 237. Thus the relative speeds between the cam-head 205 and the cam-head 206 are also increased at a rate varying with the rate of reverse movement of the vehicle and are increased over those which can occur during the forward travel of the vehicle, with the result that the frequency of operation of the auxiliary flashing-switch 72 will be increased. Therefore, at variable points during each half-cycle of operation of the cams 296 and 297, the speed-indicating light 161 will be flashed at maximum brilliancy at a frequency rate in excess of the one flash which can occur when the vehicle is at a standstill. Thus the frequency rate of flash of the said auxiliary speed-indicating light 161 in excess of one, during each of the half-cycles of operation referred to, will be controlled by the rate of reverse movement of the vehicle.

The signals effected, at the reverse rate of speed of seven miles per hour, under the conditions just described are indicated in Fig. 28.

If during the reverse travel of the vehicle, while the accelerator-pedal 94 is in the depressed position, it is desired to make a turn, the blade 169 of the direction-signal switch 168 will be operated either to the left or to the right, as the case may be, whereupon either the left-direction lights 164 and 165 or the right-direction lights 166 and 167 will be steadily illuminated thus supplementing the illumination of the speed-indicating lights 104, 105 and 161 to include with the other signal indications, the signal indication of the turning of the vehicle in the respective direction.

In Fig. 29 is graphically represented the signals effected at the reverse rate of speed of seven miles per hour, under the conditions just described, when the blade 169 of the direction-signal switch 168 is operated for the purpose of indicating the travel of the vehicle in a direction to the left.

In the event that the operator should have caused the movement of the vehicle in a direction to the left during the reverse travel thereof and then operated the accelerator-pedal 94 to the idle position, the blade 194 of the direction-light periodicity-control switch 193 would have been moved into engagement with the contact 192 with the result of the re-energization of the electromagnet 189 caused the shifting of the switch-blades 108 and 174. Under the conditions now being described, the action of the said electromagnet 189 cuts out the speed-indicating light 104 and substitutes therefor the left-direction lights 164 and 165. The left-direction light 164 will be caused to flash concurrently with the speed-indicating light 105 and the left-direction light 165 will be caused to flash alternately with the said lights 105 and 164. The constant-speed flashing-switch 121 being in effect out of action, each of the said lights, just referred to, will be flashed at a frequency rate in excess of six during each half-cycle of operation of the cams 296 and 297.

While it has been hereinbefore described that the present embodiment of the invention is adapted to effect the steady illumination of the speed-indicating light 105 at rates of speed of the vehicle in excess of forty miles per hour, when the accelerator-pedal 94 is in the idle position, the invention is not limited thereto as it is only necessary to adapt the contact 125 of the main flashing-switch 126 to be engaged by the blade 127 thereof when the rotary cam-head 255 is being driven by the rotary cam-head 251 to effect flashing signals under such conditions.

It is to be noted that when the blade 127 of the main flashing-switch 126 is maintained in engagement with the contact 125, the energization of the electromagnet 117 is controlled by the constant-speed flashing-switch 121 instead of jointly by both of the said flashing-switches as before. Under such conditions, the speed-indicating lights 104 and 105 will be alternately flashed, each flash being of equal duration and enduring for a time interval equal to a half-cycle of operation of the said constant-speed flashing-switch 121. The alternate flashing of the speed-indicating lights 104 and 105, as just described, indicates that pressure has been removed from the accelerator-pedal 94 and the vehicle is being operated forwardly in a straight-ahead direction at a rate of speed in excess of forty miles per hour.

If during the operation of the vehicle under the conditions now being described, the blade 169 of the direction-signal switch 168 should be operated to the left, the electro-magnet 189 will be energized to shift the switch-blades 108 and 174 to in turn cause the flashing at a constant frequency rate of the left-direction lights 164 and 165 in conjunction with the similar flashing of the speed-indicating light 105.

From the foregoing it will be noted that various readily-understood signals are given to an extraneous observer, such for instance as the driver of a following vehicle, to guide the latter in his movements with respect to the vehicle equipped with the present invention. The signals effected by the apparatus herein illustrated may be varied considerably but in most respects are readily comprehended by an observer with little or no previous instruction. For instance, the various signal indications automatically become of a more arresting nature as the need for exercise of greater caution increases.

While the apparatus of the signaling system of the present invention has been illustrated as associated with signal lights for descriptive purposes, it is readily apparent that the same may be associated with the electrically operated so-called wig-wag signal display units to effect the operation of the latter in an improved manner.

Furthermore, it is readily apparent that signal lights can be mounted upon wig-wag signal units and both energized by the control apparatus of the present invention to provide an almost indefinite number of signal indications.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A signaling system for vehicles, including an electrically-operated speed-indicating signal; a source of electrical energy; conducting-means for interconnecting the said source of electrical energy and the said signal; switch-means; actuating-means for the said switch-means including two relatively-movable members, both of which are constructed and arranged to co-operate in effecting the operation of the said switch-means, one of the said members being operated by the movement of the vehicle and at speeds changing in direct relationship with changes in the speed of the said vehicle; driving-means connected to the other member of the said actuating-means for operating the same at a substantially-constant speed; the said actuating-means being so constructed and arranged as to actuate the said switch-means to cause pulsations in the current supplied to the said signal when the speed of the vehicle is below a predetermined speed, and to supply steady current to the said signal when the speed of the vehicle exceeds the said predetermined speed.

2. A signaling system for vehicles, including an electrically-operated speed-indicating signal; a source of electrical energy; conducting-means for interconnecting the said source of electrical energy and the said signal; first switch-means acting to cause pulsations in the current supplied to the said signal and operating to progressively increase the pulsation rate as the forward speed of the vehicle decreases; and second switch-means automatically shiftable with the movement of a speed control member of the vehicle and so constructed and arranged as to serve when in one position to interrupt the pulsations in current-flow occasioned by the said first switch-means.

3. A signaling system for vehicles, including an electrically-operated speed indicating signal; a source of electrical energy; conducting-means for interconnecting the said source of electrical energy and the said signal; first switch-means; actuating-means for the said first switch-means, including two relatively-movable members, both of which are constructed and arranged to co-operate in effecting the operation of the said first switch-means, one of the said members being operated by the movement of the vehicle at speeds changing in direct relationship with changes in the speed of the vehicle; driving-means connected to the other member of the said actuating-means for operating the same at a substantially-constant speed; electromagnetic switch-means for controlling the said signal and energized through the said first switch-means; and second switch-means automatically shiftable by a speed control member of the vehicle and adapted in one position to interrupt the energization of the said electromagnetic switch-means occasioned by the said first switch-means.

4. A signaling system for vehicles, including an electrically-operated speed indicating signal; a source of electrical energy; an electrical circuit for interconnecting the said source of electrical energy and the said signal; first switch-means acting to cause pulsations in the current-flow in the said electrical circuit; actuating-means for the said first switch-means acting to increase the frequency of operation thereof as the forward speed of the vehicle decreases including two relatively-movable members, one of which is driven by and varies in speed in direct relationship with changes in the speed of the vehicle, and the other of which members is driven at a substantially-constant speed; second switch-means; actuating-means for the said second switch-means, including two relatively-movable members, both of which are so constructed and arranged as to co-operate in effecting the operation of the said second switch-means, one of the said members being driven by the movement of the vehicle and at speeds changing in direct relationship with changes in the speed of the said vehicle; and driving-means connected to the other member of the said actuating-means for driving the same at a substantially-constant speed; the said first switch-means and the said second switch-means being so constructed and so arranged in the system as to jointly control the energization of the said signal.

5. A signaling system for vehicles, including a speed-indicating signal-light; a source of electrical energy; conducting-means for interconnecting the said source of electrical energy and the said signal-light; first switch-means acting to cause pulsations in the current-flow in the said conducting-means; actuating-means for the said first switch-means, including two relatively-movable members, one of which changes in speed in direct proportion to changes in the speed of the vehicle, and the other of which is driven at a substantially-constant speed; second switch-means; actuating-means for the said second switch-means, including two relatively-movable members, both of which are so constructed and arranged as to co-operate in effecting the operation of the said second switch-means, one of the said members being driven by the movement of the vehicle and at speeds changing in direct relationship with changes in the speed of the said vehicle; and driving-means connected to the other member of the said actuating-means for driving the same at a substantially-constant speed; the said actuating-means being so constructed and arranged as to cause the said second-switch means to interrupt the pulsations in current-flow occasioned by the said first switch-means, when the speed of the vehicle exceeds a predetermined speed.

6. A signaling system for vehicles, including an electrically-operated speed-indicating signal; a source of electrical energy; conducting-means for interconnecting the said source of electrical energy and the said signal; first switch-means acting to control the energization of the said signal; operating-means for the said first switch-means; second switch-means; actuating-means for the said second switch-means, including two relatively-movable members, one of which changes in speed in direct proportion to changes in the speed of the vehicle, and the other of which is driven at a substantially-constant speed; third switch-means; actuating-means operating the said third-switch means at a substantially-constant speed; the said operating-means for the said first switch-means being so constructed and arranged in the system as to respond to the movement of the said second switch-means and the said third switch-means.

7. A signaling system for vehicles, including a speed-indicating signal-light; a source of electrical energy; conducting-means for interconnecting the said source of electrical energy and the said signal-light; first switch-means; actuating-means for the said first switch-means, including two relatively-movable members, one of which changes in speed in direct proportion to changes in the speed of the vehicle, and the other of which is driven at a substantially-constant speed; second switch-means; actuating-means operating the said second-switch means at a substantially-constant speed; and electromagnetic-means affecting the current-flow in the said conducting-means to cause the flashing of the said signal-light, the said electromagnetic-means being constructed and arranged in the system in such manner as to be controlled by both the said first switch-means and by the said second switch-means.

8. A signaling system for vehicles, including a speed-indicating signal-light; a source of electrical energy; conducting-means for interconnecting the said source of electrical energy and the said signal-light; first flashing-switch means; actuating-means for the said first flashing-switch means including two relatively-movable members, one of which is driven by the movement of the vehicle at speeds changing in direct proportion to changes in the speed of the vehicle, and the other of which members is driven at a substantially-constant speed; second flashing-switch means; actuating-means operating the said second flashing-switch means at a substantially-constant speed; the said actuating-means for the said first flashing-switch means being constructed and arranged to cause the said first switch-means to act jointly with the said second switch-means to control the energization of the said signal-light when the speed of the vehicle is below a predetermined speed, and being constructed and arranged to maintain the said first switch-means in one position to permit the energization of the said signal-light under the control of the said second switch-means when the speed of the vehicle exceeds the said predetermined speed.

9. A signaling system for vehicles, including a speed-indicating signal-light; a source of electrical energy; conducting-means for interconnecting the said source of electrical energy and the said signal-light; first flashing-switch means; actuating-means for the said first flashing-switch means including two relatively-movable members, one of which is driven by the movement of the vehicle at speeds changing in direct proportion to changes in the speed of the vehicle, and the other of which members is driven at a substantially-constant speed; second flashing-switch means; actuating-means operating the said second flashing-switch means at a substantially-constant speed; the said actuating-means for the said first flashing-switch means being constructed and arranged to cause the said first switch means to act jointly with the said second switch means to control the energization of the said signal-light when the speed of the vehicle is below a predetermined speed, and being constructed and arranged to maintain the said first switch-means in one position to effect the steady energization of the said signal-light when the speed of the vehicle exceeds the said predetermined speed.

10. A signaling system for vehicles, including two signal-lights; a source of electrical energy; conducting-means for interconnecting the said source of electrical energy and the said signal-lights; first switch-means acting to control the energization of the said signal-lights; second switch-means; actuating-means for the said second switch-means including two relatively-movable members, one of which is driven by the movement of the vehicle at speeds changing in direct proportion to changes in the speed of the vehicle, and the other of which members is driven at a substantially-constant speed; third switch-means; actuating-means operating the said third-switch means at a substantially-constant speed; operating-means for the said first switch-means constructed and arranged in the system in such manner as to be controlled by the said second switch-means and by the said third switch-means; the said actuating-means for the said second-switch means being also constructed and arranged to cause the said second switch-means to act jointly with the said third switch-means to control the energization of the said signal-lights when the speed of the vehicle is below a predetermined speed, and being also constructed and arranged to maintain the said second switch-means in one position to effect the steady energization of one of the said signal-lights when the speed of the vehicle exceeds the said predetermined speed.

11. A signaling system for vehicles, including a speed-indicating signal-light; a source of electrical energy; conducting-means for interconnecting the said source of electrical energy and the said signal-light; first switch-means; actuating-means for the said first switch-means, including two relatively-movable members, both of which are constructed and arranged to co-operate in effecting the opening and closing of the said first switch-means and the rate of relative movement between which determines the speed of opening and closing of the said first switch-means; means for operating one of the said members by the movement of the vehicle at speeds varying in direct relationship with changes in the speed of the vehicle; driving-means connected to the other member of the said actuating-means for operating the same at a substantially-constant speed; second switch-means; actuating-means operating the said second-switch means at a substantially-constant speed; and electromagnetic flashing-switch means constructed and arranged in the system in such manner as to be controlled by the said first switch-means and by the said second switch-means and acting to cause the flashing of the said signal-light.

12. A signaling system for vehicles, including two signal-lights; a source of electrical energy; an electrical circuit for interconnecting the said source of electrical energy and the said signal-lights; first switch-means acting to cause pulsations in the current-flow in the said electrical circuit; actuating-means for the said first switch-means, including two relatively-movable members, one of which changes in speed in direct proportion to changes in the speed of the vehicle, and the other of which is driven at a substantially-constant speed; second switch-means; actuating means operating the said second-switch means at a substantially-constant speed; and third switch-means under the control of the movement of a speed control member of the vehicle; the said third switch-means being constructed and arranged in the system in such manner as in one position to permit the said second switch-means to periodically interrupt the pulsations occasioned by the said first switch-means, and in another position to permit the said second switch-means to periodically interrupt the said pulsations and simultaneously energize one of the said signal-lights.

13. A signaling system for vehicles, including two signal-lights; a source of electrical energy; conducting-means for interconnecting the said source of electrical energy and the said signal-lights; first switch-means acting to cause pulsations in the current-flow in the said conducting-means; actuating-means for the said first switch-means, including two relatively-movable members, one of which changes in speed in direct proportion to changes in the speed of the vehicle, and the other of which is driven at a substantially-constant speed; second switch-means; actuating-means operating the said second-switch means at a substantially-constant speed; and third switch-means actuated by a speed control member of the vehicle; the said second switch-means being constructed and arranged in the system in such manner as in one position to act jointly with the said first switch-means to effect the energization of the said signal-lights, and in another position to act jointly with the said third switch-means to effect the energization of one of the said signal-lights independently of the action of the said first switch-means.

14. A signaling system for vehicles, including an electrically-operated speed-indicating signal;

a source of electrical energy; conducting-means for interconnecting the said source of electrical energy and the said signal; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; second switch means; actuating-means operating the said second-switch means at a substantially constant speed; and third switch-means constructed and arranged in the system in such manner as in one position to permit energization of the said signal under the joint control of the said first switch-means and the said second switch-means, and in another position to permit energization of the said signal independently of the operation of the said second switch-means.

15. A signaling system for vehicles, including a speed-indicating signal-light; a source of electrical energy; conducting-means for interconnecting the said source of electrical energy and the said signal-light; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; second switch-means; actuating-means operating the said second-switch means at a substantially-constant speed; and third switch-means automatically shiftable by a speed control member of the vehicle; the said first switch-means, the said second switch-means, and the said third switch-means being connected to the said conducting-means in such manner that when the said third switch-means is in one position the current flow in the said conducting-means is under the joint control of the said first switch-means and the said second switch-means, and when the said third switch-means is in another position the current flow in the said conducting-means is independent of the operation of the said second switch-means.

16. A signaling system for vehicles, including a speed-indicating signal-light; a source of electrical energy; conducting-means for interconnecting the said source of electrical energy and the said signal-light; first switch-means; actuating-means for the said first switch-means, including two relatively-movable members, both of which are constructed and arranged to cooperate in effecting the opening and closing of the said first switch-means, one of the said members being operated by the movement of the vehicle at speeds varying in direct proportion to variations in the speed of the vehicle; driving-means connected to the other member of the said actuating-means for operating the same at a substantially-constant speed; second switch-means; actuating-means operating the said second-switch means at a substantially-constant speed; and third switch-means automatically shiftable by a speed control member of the vehicle; the said first switch-means, the said second switch-means, and the said third switch-means being connected to the said conducting-means in such manner that when the said third switch-means is in one position the energization of the said signal-light is under the joint control of the said first switch-means and the said second switch-means, and when the said third switch-means is in another position the energization of the said signal-light is independent of the operation of the said second switch-means.

17. A signaling system for vehicles, including two signal-lights; a source of electrical energy; conducting-means for interconnecting the said source of electrical energy and the said signal-lights; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; second switch-means; actuating-means operating the said second-switch means at a substantially-constant speed; and third switch-means constructed and arranged in the system in such manner as in one position to permit pulsations in current-flow in the said conducting-means under the joint control of the said first switch-means and the said second switch-means, and in another position to permit pulsations in current-flow in the said conducting-means independently of the operation of the said second switch-means; and fourth switch-means constructed and arranged in the system in such manner as in one position to divert the said pulsations to one of the said signal-lights, and in another position to divert the said pulsations to the other of the said signal-lights.

18. A signaling system for vehicles, including a speed-indicating signal-light; a source of electrical energy; an electrical circuit for interconnecting the said source of electrical energy and the said signal-light; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; an electric motor operating at a substantially-constant speed; second switch-means operated by the said electric motor; magnet-operated means; an operating circuit for said magnet-operated means including the said first switch-means and the said second switch-means; and third switch-means acting to control the energization of said signal-light, the said third switch-means being constructed and arranged in the system in such manner as to be controlled by both the said electric motor and the said magnet-operated means.

19. A signaling system for vehicles, including a speed-indicating signal-light; a source of electrical energy; an electrical circuit for interconnecting the said source of electrical energy and the said signal-light; first switch-means; actuating-means for the said first switch-means, including two relatively-movable members, one of which members is driven by the movement of the vehicle at speeds changing in direct relationship to changes in the speed of the vehicle, and the other of which members is driven at a substantially-constant speed; an electric motor operating at a speed independent of the speed of the vehicle; second switch-means operated by the said electric motor; magnet operated switch-control means; an operating circuit for the said magnet operated means including the said first switch-means and the said second switch-means; and third switch-means acting to control the energization of the said signal-light, the said third switch-means being constructed and arranged in the system in such manner as to be controlled by both the said electric motor and the said magnet operated switch-control means.

20. A signaling system for vehicles, including a speed-indicating signal-light; a source of electrical energy; an electrical circuit for interconnecting the said source of electrical energy and the said signal-light; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; an electric motor operating at a substantially-constant speed; second switch-means operated by the said electric motor; third switch-means; electromagnetic-means actuating the said third-switch means; a control circuit for the said electromagnetic means including the said first switch-means, the said second switch-means, and the said third switch-means, all of which switch-means being interconnected in such manner that when the said second switch-means acts previously to the said first switch-means to open the said control circuit, the said third switch-means acts to maintain the said control circuit closed until such time as the said first switch-means acts to open the said control circuit; and fourth switch-means acting to control the energization of the said signal-light, the said fourth switch-means being constructed and arranged in the system in such manner as to be controlled by both the said electric motor and the said electromagnetic means.

21. A signal system for vehicles including: a speed-indicating signal light; a source of electrical energy; conducting-means for interconnecting the said source of electrical energy and the said signal-light; a resistance-unit; first-switch means constructed and arranged in the system to supply steady current to the said signal-light through the said resistance; operating-means for the said first-switch means actuated by a running part of the vehicle and serving to move the said first-switch means into position to supply current to the said signal-light through the said resistance when the vehicle reaches a predetermined speed; second switch-means constructed and arranged in the system to supply current to the said signal-light independently of the said resistance; and operating-means for the said second-switch means also actuated by a running part of the vehicle and moving the said second-switch means into position to supply current to the said signal-light independently of the said resistance and of the said first-switch means when the vehicle reaches a predetermined speed differing from the predetermined speed at which the operating-means for the first-switch means acts.

22. A signal system for vehicles, including an electrically-operated speed indicating signal; a source of electrical energy; conducting means for interconnecting the said source of electrical energy and the said signal; first switch-means; actuating-means for the said first switch means including two relatively-movable members, one of which is driven by the movement of the vehicle at speeds changing in direct proportion to changes in the speed of the vehicle, and the other of which members is driven at a substantially-constant speed; second switch-means; actuating-means operating the said second switch-means at a substantially-constant speed; third switch-means; and actuating-means for the said third switch-means constructed and arranged in the system in such manner as to be controlled by both the said first switch-means and the said second switch-means; the said first switch-means, the said second switch-means, and the said third switch-means being also constructed and arranged in the system in such manner as to jointly control the energization of the said signal.

23. A signaling system for vehicles, including an electrically-operated speed-indicating signal; a source of electrical energy; conducting-means for interconnecting the said source of electrical energy and the said signal; first switch-means; actuating-means for the said first switch-means including two relatively-movable members, one of which is driven by the movement of the vehicle at speeds changing in direct proportion to changes in the speed of the vehicle, and the other of which members is driven at a substantially-constant speed; second switch-means; actuating-means operating the said second switch-means at a substantially-constant speed; electromagnetic switch-means; and a locking-circuit controlled by the said first switch-means and by the said second switch-means and in turn controlling the said electromagnetic switch-means; the said first switch-means, the said second switch-means, and the said electromagnetic switch-means being also constructed and arranged in the system in such manner as to jointly control the energization of the said signal.

24. A signaling system for vehicles, including an electrically-operated speed-indicating signal; a source of electrical energy; conducting-means for interconnecting the said source of electrical energy and the said signal; first switch-means constructed and arranged to cause pulsations in the current-flow in the said conducting-means; actuating-means for the said first switch-means including two relatively-movable members, one of which is driven by the movement of the vehicle at speeds changing in direct proportion to changes in the speed of the vehicle, and the other of which members is driven at a substantially-constant speed; second switch-means; actuating-means operating the said second switch-means at a substantially-constant speed; electromagnetic switch-means; and a locking-circuit controlled by the said first switch-means and by the said second switch-means and in turn controlling the operation of the said electromagnetic switch-means; the said second switch-means and the said electromagnetic switch-means being constructed and arranged in the system in such manner as to periodically interrupt the pulsations occasioned by the said first switch-means.

25. A signaling system for vehicles including an electrically-operated speed-indicating signal; a source of electrical energy; conducting-means for interconnecting the said source of electrical energy with the said signal; first switch-means; actuating-means for the said first switch-means, including two relatively-movable members, one of which is driven by the movement of the vehicle at speeds changing in direct proportion to changes in the speed of the vehicle, and the other of said members being driven at a substantially-constant speed; second switch-means; actuating-means actuating the said second switch-means at a substantially-constant speed; third switch-means controlling the current-flow to the said speed-indicating signal; and electromagnetic-means actuating the said third switch-means and connected into the system in such manner as to be responsive to the joint control of the said first switch-means and the said second switch-means.

26. A signaling system for vehicles, including an electrically-operated speed-indicating signal; a source of electrical energy; conducting-means for interconnecting the said source of electrical energy and the said signal; first switch-means acting to control the energization of the said signal; second switch-means; actuating-means for the said second switch-means including two relatively-movable members, one of which changes in speed in direct proportion to changes in the speed of the vehicle and the other of which is driven at a substantially-constant speed; third automatic switch-means opening and closing at a substantially-constant speed; and substantially-constant-speed means acting in conjunction with the said second switch-means and the said third switch-means to jointly control the operation of the said first switch-means.

HENRY S. DAVIS.